(12) United States Patent
Saida et al.

(10) Patent No.: US 7,495,892 B2
(45) Date of Patent: Feb. 24, 2009

(54) SOLID ELECTROLYTIC CAPACITOR

(75) Inventors: Yoshihiro Saida, Tokyo (JP); Yoshifumi Asai, Tokyo (JP); Hideki Oohata, Tokyo (JP)

(73) Assignee: Showa Denko K.K., Tokyo (JP)

( * ) Notice: Subject to any disclaimer, the term of this patent is extended or adjusted under 35 U.S.C. 154(b) by 236 days.

(21) Appl. No.: 11/410,975

(22) Filed: Apr. 26, 2006

(65) Prior Publication Data

US 2007/0030622 A1 Feb. 8, 2007

Related U.S. Application Data

(60) Provisional application No. 60/677,806, filed on May 5, 2005, provisional application No. 60/677,407, filed on May 4, 2005.

(30) Foreign Application Priority Data

| Apr. 27, 2005 | (JP) | ............................. 2005-130109 |
| Apr. 27, 2005 | (JP) | ............................. 2005-130110 |

(51) Int. Cl.
*H01G 9/04* (2006.01)
*H01G 9/145* (2006.01)

(52) U.S. Cl. ..................................... 361/528; 29/25.03

(58) Field of Classification Search ................. 361/523, 361/528–529
See application file for complete search history.

(56) References Cited

U.S. PATENT DOCUMENTS

| 3,345,545 | A | * | 10/1967 | Bourgault et al. ........... 361/529 |
| 3,581,159 | A | * | 5/1971 | Piper et al. .................. 361/532 |
| 3,588,626 | A | * | 6/1971 | Cooper ....................... 361/529 |
| 4,104,704 | A | * | 8/1978 | Weaver ....................... 361/532 |
| 4,162,518 | A | * | 7/1979 | Curlis, Jr. ................... 361/528 |
| 4,945,452 | A | * | 7/1990 | Sturmer et al. .............. 361/529 |

(Continued)

FOREIGN PATENT DOCUMENTS

JP 61-4346 2/1986

(Continued)

*Primary Examiner*—Eric Thomas
(74) *Attorney, Agent, or Firm*—Sughrue Mion, PLLC

(57) ABSTRACT

The present invention relates to an anode substrate for a solid electrolytic capacitor which is produced by cutting obliquely a metal substrate comprising a valve-acting metal layer having fine pores and a valve-acting metal layer without fine pores, and having a cut surface which is formed by elongation of the valve-acting metal layer without fine pores dragged by a cutting blade; particularly to an anode substrate for a solid electrolytic capacitor which is produced by cutting obliquely a metal substrate comprising a valve-acting metal layer having fine pores and a valve-acting metal layer without fine pores, and a layer of the elongated valve-acting metal which is generated by that the valve-acting metal layer without fine pores is elongated being dragged along with a cutting blade and covers the edge part of the valve-acting layer having fine pores meets the requirement represented by the following formula:

$$0 \leq y/z \leq 1 \quad \text{[Formula 1]}$$

wherein y represents the thickness of the layer of the elongated valve-acting metal in the direction of the thickness of the substrate and z represents the thickness of the valve-acting layer having fine pores which is in contact with the elongated metal layer in the direction of the thickness of the substrate, respectively; and to a solid electrolytic capacitor comprising the above-mentioned anode substrate, an edge of which is chamfered at least partially.

46 Claims, 7 Drawing Sheets

U.S. PATENT DOCUMENTS

| | | | |
|---|---|---|---|
| 5,349,496 A * | 9/1994 | Taniguchi et al. | 361/528 |
| 5,825,611 A * | 10/1998 | Pozdeev | 361/524 |
| 6,128,180 A * | 10/2000 | Araki et al. | 361/525 |
| 6,229,689 B1 | 5/2001 | Kobayashi et al. | |
| 7,138,000 B2 * | 11/2006 | Kuriyama | 29/25.03 |

FOREIGN PATENT DOCUMENTS

| | | |
|---|---|---|
| JP | 1-251605 | 10/1989 |
| JP | 2-15611 | 1/1990 |
| JP | 5-299309 | 11/1993 |
| JP | 2001-143968 | 5/2001 |
| JP | 2002-158144 | 5/2002 |
| JP | 2003-124068 | 4/2003 |
| JP | 2003-188052 | 7/2003 |
| JP | 2004-296611 | 10/2004 |
| JP | 2005-52944 | 3/2005 |
| WO | WO 99/28932 | 6/1999 |

\* cited by examiner

100 μm

100 μm

SOLID ELECTROLYTIC CAPACITOR

CROSS REFERENCE TO THE RELATED APPLICATIONS

This is an application filed pursuant to 35 U.S.C. Section 111(a) with claiming the benefit of U.S. Provisional Application Ser. No. 60/677,407 filed May 4, 2005 and No. 60/677,806 filed May 5, 2005 under the provision of 35 U.S.C. Section 111(b), pursuant to 35 U.S.C. Section 119(e) (1).

TECHNICAL FIELD

The present invention relates to a solid electrolytic capacitor using an electrically conducting polymer as the solid electrolyte layer, and a production method thereof.

BACKGROUND ART

The basic element of a solid electrolytic capacitor is generally produced, as shown in FIG. 2, by forming a dielectric oxide film layer (2) on an anode substrate (1) comprising a metal foil subjected to an etching treatment to have a large specific surface area, forming a solid semiconductor layer (hereinafter referred to as a "solid electrolyte") (4) as a counter electrode on the outer side of the dielectric oxide layer, and preferably further forming thereon an electrically conducting layer (5) such as electrically conducting paste. Using this element as-is alone or after stacking these elements, lead wires (6, 7) are connected thereto and the entirety is then completely encapsulated with sealing resin (8) such as epoxy resin and used as a part of a solid electrolytic capacitor (9) in electric products over a wide range.

With recent progress of digitization of electric devices or high-speed processing of personal computers, a compact and large-capacitance capacitor or a capacitor assured of low impedance in the high frequency region is being demanded. In order to meet this requirement, it has been recently proposed to use an electrically conducting polymer having electron conductivity as the solid electrolyte.

As for the technique of forming an electrically conducting polymer on a dielectric oxide film, an electrolytic oxidative polymerization method and a chemical oxidative polymerization method are generally known. In the chemical oxidative polymerization method, the reaction or the polymer film morphology is difficult to control, but the formation of solid electrolyte is easy and since this enables mass production in a short time, various methods have been proposed thereon. For example, a method of alternately repeating a step of dipping an anode substrate in a monomer-containing solution and a step of dipping the substrate in an oxidizing agent-containing solution, thereby forming a solid electrolyte having a layer structure, has been disclosed (see, Japanese Patent Publication No. 3,187,380; WO99/28932). According to this method, a high-capacitance and low-impedance solid electrolytic capacitor with excellent heat resistance can be produced by forming a solid electrolyte layer having a layer structure with a film thickness of 0.01 to 5 μm. However, in this method it is necessary to form a thick solid electrolyte film to completely cover the inside of fine pores and outer surface of a capacitor element to exert such characteristics. In the light of use as an element for a multilayer capacitor fabricated by stacking a plurality of capacitor elements, it is demanded to further reduce the thickness of the solid electrolyte layer as a whole.

Various techniques have been disclosed for forming uniformly a solid electrolyte inside pores and on the outer surface of a capacitor element. For example, there is a disclosure of a method controlling the distribution of the attached amount of an oxidizing agent on the anode body during the process of forming an electrically conducting polymer to thereby control the thickness of an electrically conducting polymer (JP-A-2003-188052 (the term "JP-A" as used herein means an "unexamined published Japanese patent application")). It is also disclosed that forming a polymer layer on the circumference, especially on the corner part (JP-A-2001-143968).

Meanwhile, it has been disclosed that the short-circuit fraction defective can be reduced by removing burrs of an electrode foil (JP-A-1-251605 and JP-A-2004-296611). In JP-A-1-251605, a burr is referred to the part generated at the time of cutting on the outside of an electrode foil, and a method of shaping the cut edge of an electrode foil by pressing into the form of any combination of a wedge, convexity, almost-semiellipse, almost-R-shape and slope. Shaping by pressing leads to destroying the porous layer existing in the electrode foil, thereby degrading reliability. There is not any specific description with respect to the status of burrs after pressing, microstructure of the side surface of the electrode foil or the causes of generation of burrs on the electrode foil. Meanwhile, in JP-A-2004-296611, generation of burrs is prevented by chemically forming the valve-acting metal foil in which a cut has been made in advance and then physically cutting the foil. This method is effective in preventing the generation of burrs but a metal surface is newly generated on the cut end. Therefore, the valve-acting metal foil cannot be used as an electrode of a capacitor as it is, and requires to repeat cumbersome chemical formation treatment and is not a very economical method.

DISCLOSURE OF THE INVENTION

A solid electrolytic capacitor having a predetermined capacitance is usually produced by stacking a plurality of capacitor elements, connecting an anode lead wire to the anode terminal, connecting a cathode lead wire to the electrically conducting layer containing an electrically conducting polymer, and encapsulating the entirety with epoxy resin or the like. In such a solid electrolytic capacitor, the electrically conducting polymer needs to be made thick by controlling the polymerization conditions of the electrically conducting polymer in the cathode portion of the capacitor element. If the polymerization conditions of the electrically conducting polymer in the cathode portion of the capacitor element are not precisely controlled, the thickness of the electrically conducting polymer becomes uneven and the electrically conducting polymer comes to have a thin portion, in which direct contact of the paste or the like with the dielectric oxide film layer readily occurs, giving rise to increase in the leakage current. Furthermore, since the number of capacitor elements which can be stacked in a solid electrolytic capacitor chip having a predetermined size is limited by the thickness of the element, the capacitance of the solid electrolytic capacitor chip cannot be increased. Specifically, in a capacitor element, the coverage thickness of the electrically conducting polymer tends to be uneven on the edge part of the side and end surfaces having small surface areas, which may readily cause direct contact of the capacitor elements to each other on such a thin portion of the electrically conducting polymer when they are laminated, leading to a problem of increase in leakage current.

Accordingly, an object of the present invention is to solve those problems, that is, to stably produce a thin capacitor element without increasing short circuit failures while ensuring less fluctuation in the element shape, achieve high capacitance by increasing the number of capacitor elements stacked in a solid electrolytic capacitor chip, and provide a solid electrolytic multilayer capacitor element with less fluctuation in the equivalent series resistance and a production method thereof.

As a result of intensive studies in the light of the above-described object, the present inventors have found that a method of cutting obliquely the anode substrate having fine pores is effective. They also have found that, when cutting obliquely the anode substrate, valve-acting metal without fine pores was elongated, thereby generating protrusions. It is already known that the electrically conducting polymer film is hard to be formed on a corner part, and the present inventors have found that the formation of the polymer film is hindered on the protrusions formed on the corner, which may readily cause direct contact of the capacitor elements to each other and lead to the increase of leakage current. Particularly, it has been confirmed that the electrically conducting polymer film is harder to be formed on the valve-acting metal without fine pores of the anode substrate, since it has less ability to retain the solution deposited on the surface thereof compared to the porous layer having fine pores.

Also, the present inventors have found that imparting the cut surface formed by the elongation of the valve-acting metal layer without having pores of the anode substrate when dragged by a cutting blade with a structure having grooves oblique or parallel to the direction of the short axis helps the absorption of solution to the surface of the valve-acting metal without ability of retaining the solution, thereby having an effect on facilitating forming the electrically conducting polymer film more uniformly.

The present inventors have found that, by using an anode substrate the edge of which is chamfered at least partially, the formation of the polymerized film proceeds uniformly on a corner part and side surface of a valve-acting metal in a consequent process of forming solid electrolyte layer on a dielectric layer by polymerizing a monomer with use of an oxidizing agent. That is, the present inventors have found that, by adjusting the angle of a corner part of an anode substrate to more than 90°, the formation of the polymerized film proceeds uniformly on the corner part and achieved the present invention based on this finding.

Further, the present inventors have found that imparting the cut surface formed by the elongation of the valve-acting metal layer without having pores of the chamfered anode substrate when dragged by a cutting blade with a structure having grooves obliquely or parallel to the direction of the short axis with a structure having grooves obliquely or parallel to the direction of the short axis helps the absorption of solution to the surface of the valve-acting metal without ability of retaining the solution, thereby having an effect on facilitating forming the electrically-conducting polymer film more uniformly.

Therefore, the present inventors have produced a solid electrolytic capacitor using a cut foil obtained by cutting obliquely an anode substrate having fine pores, so that the elongated part of a valve-acting metal without fine pores generated at cutting may not go beyond the circumference of the anode substrate and confirmed that the solid electrolytic capacitor obtained in this way is enhanced in the adhesive property or close attachment of the solid electrolyte formed on the dielectric film and assured of high capacitance and reduction in the dielectric loss (tan δ), leakage current and defective ratio. Furthermore, it is confirmed that downsizing and high capacitance of a capacitor can be realized by stacking a plurality of the above-described solid electrolytic capacitor elements having excellent properties.

The present invention relates to an anode substrate for a solid electrolytic capacitor, a solid electrolytic capacitor comprising the anode substrate, a production method of the solid electrolytic capacitor, a solid electrolytic capacitor produced by the method, a solid electrolytic capacitor containing the above-mentioned anode substrate the edge of which is chamfered at least partially, a chamfered anode substrate for a solid electrolytic capacitor used in the above-mentioned solid electrolytic capacitor, a method for producing a solid electrolytic capacitor which comprises providing a dielectric layer and a solid electrolyte layer on the anode substrate for a solid electrolytic capacitor or providing a solid electrolyte layer on the anode substrate for a solid electrolytic capacitor having a dielectric film layer thereon, and the solid electrolytic capacitor produced by the method, shown below.

1. An anode substrate for a solid electrolytic capacitor, which is an anode substrate produced by cutting obliquely a metal substrate comprising a valve-acting metal layer having fine pores and a valve-acting metal layer without fine pores, and having a cut surface which is formed by elongation of the valve-acting metal layer without fine pores dragged by a cutting blade.

2. The anode substrate for a solid electrolytic capacitor as described in 1 above, which is an anode substrate produced by cutting obliquely a metal substrate comprising a valve-acting metal layer having fine pores and a valve-acting metal layer without fine pores, and a layer of the elongated valve-acting metal which is generated by elongation of the valve-acting metal layer without fine pores dragged by a cutting blade and covering the edge part of the valve-acting layer having fine pores meets the requirement represented by the following formula:

$$0 \leq y/z \leq 1 \qquad \text{[Formula 1]}$$

wherein y represents the thickness of the layer of the elongated valve-acting metal in the direction of the thickness of the substrate and z represents the thickness of the valve-acting layer having fine pores which is in contact with the elongated metal layer in the direction of the thickness of the substrate, respectively.

3. The anode substrate for a solid electrolytic capacitor as described in 1 above, which is in the form of a plate or foil and is obtained by cutting obliquely so as to make the inner angle between the edges of the anode substrate surface from which cutting starts and the cut surface more than 90° to 135° or less.

4. The anode substrate for a solid electrolytic capacitor as described in 2 above, which is in the form of a plate or foil and is obtained by cutting and removing the part of the elongated valve-acting metal layer protruded from the surface of the anode substrate.

5. The anode substrate for a solid electrolytic capacitor as described in 2 above, which is in the form of a plate or foil and is obtained by chamfering the edges including the part of the elongated valve-acting metal layer protruded from the surface of the anode substrate.

6. The anode substrate for a solid electrolytic capacitor as described in above 2, which is in the form of a plate or foil and is obtained by pressing a forming material to the part of the elongated valve-acting metal layer protruded from the surface of the anode substrate thereby to eliminate the protrusion.

7. The anode substrate for a solid electrolytic capacitor as described in 2 above, which is an anode substrate produced by cutting obliquely a metal substrate comprising a valve-acting metal layer having fine pores and a valve-acting metal layer without fine pores, and has grooves located obliquely Qr parallel to the direction of the short axis of the cut surface formed by the elongation of the valve-acting metal layer without pores of the anode substrate when dragged by a cutting blade.

8. The anode substrate for a solid electrolytic capacitor as described in 7 above, wherein the width of the grooves oblique or parallel to the direction of the short axis of the cut surface is from 0.1 to 1000 μm.

9. The anode substrate for a solid electrolytic capacitor as described in 7 above, wherein the pitch of the grooves oblique or parallel to the direction of the short axis of the cut surface is from 0.1 to 10 μm.

10. The anode substrate for a solid electrolytic capacitor as described in 7 above, wherein the depth of the grooves oblique or parallel to the direction of the short axis of the cut surface is from 0.1 to 10 μm.

11. The anode substrate for a solid electrolytic capacitor as described in any one of above 1 to 10, which is made of aluminum.

12. The anode substrate for a solid electrolytic capacitor as described in 11 above, wherein the anode substrate is produced by cutting in rectangles a chemically formed aluminum foil having fine pores by a cutting machine.

13. A solid electrolytic capacitor characterized by containing the anode substrate for a solid electrolytic capacitor described in any one of 1 to 12 above.

14. A method for producing a solid electrolytic capacitor as described in 13 above using the anode substrate for a solid electrolytic capacitor as described in any of 1 to 12 above, in which a dielectric film layer is formed on a valve-acting metal surface having fine pores and a solid electrolyte layer comprising an electrically conducting polymer composition is provided on the dielectric film by polymerizing a monomer with use of an oxidizing agent, wherein the solid electrolyte layer is provided on a valve-acting metal having a dielectric film layer thereon by a process comprising a step of dipping the valve-acting metal in a monomer-containing solution, followed by drying (Step 1) and a step of dipping the valve-acting metal in an oxidizing agent-containing solution, followed by drying (Step 2).

15. The method for producing a solid electrolytic capacitor as described in 14 above, wherein Step 1 of dipping a valve-acting metal having thereon a dielectric film layer in a monomer compound-containing solution, followed by drying and Step 2 of dipping the valve-acting metal in an oxidizing agent-containing solution, followed by drying, are repeated multiple times.

16. The method for producing a solid electrolytic capacitor as described in 14 or 15 above, wherein the oxidizing agent is a persulfate.

17. The method for producing a solid electrolytic capacitor as described in any one of 14 to 16 above, wherein the oxidizing agent-containing solution is a suspension containing organic fine particles.

18. The method for producing a solid electrolytic capacitor as described in 17 above, wherein the average particle diameter ($D_{50}$) of the organic fine particles is from 1 to 20 μm.

19. The method for producing a solid electrolytic capacitor as described in 18 above, wherein the organic fine particle is at least one member selected from the group consisting of an aliphatic sulfonic acid compound, an aromatic sulfonic acid compound, an aliphatic carboxylic acid compound, an aromatic carboxylic acid compound, a salt thereof, and a peptide compound.

20. A solid electrolytic capacitor produced by the production method described in any one of 14 to 19 above.

21. A solid electrolytic capacitor characterized by comprising an anode substrate as described in 1 above, an edge of which is chamfered at least partially.

22. The solid electrolytic capacitor as described in 21 above, wherein an anode substrate is in the form of a plate or foil and its edge between an upper surface and/or lower surface and a side surface and/or end surface of an anode substrate is chamfered at least in the region on which a solid electrolytic layer is provided.

23. The solid electrolytic capacitor as described in 22 above, wherein the angle of a corner part between an upper surface and/or lower surface and a side surface and/or end surface in a chamfered part of an anode substrate is more than 90° and less than 180°.

24. The solid electrolytic capacitor as described in 23 above, wherein the cross-sectional view of a side surface and/or end surface of an anode substrate in the direction of the thickness has the shape of a wedge, the tip of which makes an angle of 90° or more and less than 180°.

25. The solid electrolytic capacitor as described in any one of 21 to 24 above, wherein the width and/or length of an upper and lower surface of an anode substrate is different after chamfering.

26. The solid,electrolytic capacitor as described in any one of 21 to 25 above; wherein the cross-sectional view of a side surface and/or end surface of an anode substrate in the direction of the thickness after chamfering has the shape of an convex polygon of a trigona or more, each inner angle of the corners constituting the above cross-sectional shape is more than 90° and less than 180°.

27. The solid electrolytic capacitor as described in 21 above, wherein an anode substrate possesses grooves obliquely or parallel to the direction of the short axis of the cut surface formed by the elongation of the valve-acting metal layer without pores when dragged by a cutting blade, which layer is contained in the anode substrate treated by chamfering.

28. The solid electrolytic capacitor as described in above 27, wherein the width of the grooves contained in the anode substrate is from 0.1 to 100 μm.

29. The solid electrolytic capacitor as described in 27 above, wherein the pitch of the grooves contained in the anode substrate is from 0.1 to 100 μm.

30. The solid electrolytic capacitor as described in 27 above, wherein the depth of the grooves contained in the anode substrate is from 0.1 to 10 μm.

31. The solid electrolytic capacitor as described in any one of 21 to 30 above, wherein the anode substrate is made of valve-acting metal.

32. An anode substrate for a solid electrolytic capacitor used in a solid electrolytic capacitor as described in any one of 21 to 31 above, characterized by that at least a part of the edge thereof is chamfered. 33. The anode substrate for a solid electrolytic capacitor as described in 32 above, which is produced through chamfering by pressing a cutter obliquely to an edge of an anode substrate.

34. The anode substrate for a solid electrolytic capacitor as described in 32 above, having a shape in which both of the upper and lower edges are chamfered by producing an intermediate product of an anode substrate wherein the inner angle between the edges of the upper surface and the cut surface is more than 90° by pressing a slitter to the original sheet of the anode substrate, and consequently by cutting so as to make the inner angle between the edges of the lower surface and the cut surface made by the slitter more than 90° by pressing a cutter to the edge of the lower surface of the intermediate product.

35. The anode substrate for a solid electrolytic capacitor as described in 32 above, having a shape in which both of the upper and lower edges are chamfered by producing an intermediate product of an anode substrate wherein the inner angle between the edges of the lower surface and the cut surface is more than 90° by pressing a slitter to the original sheet of the anode substrate, and consequently by cutting so as to make the inner angle between the edges of the upper surface and the cut surface made by the slitter more than 90° by pressing a cutter to the edge of the upper surface of the intermediate product.

36. The anode substrate for a solid electrolytic capacitor as described in 32 above, cut by using a slitter wherein plural disk-shaped blade units each comprising a thick blade and a thin blade are provided alternately with a minute gap between each other, thereby enabling cutting between a thin blade of one disk-shaped blade and a thick blade of another disk-shaped blade, and by adjusting the gap between the blade units so that the original sheet of an anode substrate passing between the units of the alternately provided disk-shaped blades can be ejected to a direction with a tilt angle of 1° to 15° against the cutting direction of the blade.

37. The anode substrate for a solid electrolytic capacitor as described in 32 above, chamfered by pressing the side surface of the cut off anode substrate to the surface of the polishing material existing on the surface of a rotating elastic support substrate.

38. The method for producing a solid electrolytic capacitor, characterized by providing a dielectric layer and a solid electrolyte layer on the anode substrate as described in any one of 28 to 37 above.

39. The method for producing a solid electrolytic capacitor, characterized by providing a solid electrolyte layer on the anode substrate having a dielectric film layer thereon as described in any one of 28 to 37 above.

40. The method for producing the solid electrolytic capacitor described in 38 or 39 above in which a solid electrolyte layer is provided on a valve-acting metal having thereon a dielectric film layer by a process comprising a step of dipping the valve-acting metal in a monomer-containing solution, followed by drying (Step 1) and a step of dipping the valve-acting metal in an oxidizing agent-containing solution, followed by drying (Step 2).

41. The method for producing a solid electrolytic capacitor as described in 40 above, wherein Step 1 of dipping a valve-acting metal having thereon a dielectric film layer in a monomer compound-containing solution, followed by drying and Step 2 of dipping the valve-acting metal in an oxidizing agent-containing solution, followed by drying, are repeated multiple times.

42. The method for producing a solid electrolytic capacitor as described in 40 or 41 above, wherein the oxidizing agent is a persulfate.

43. The method for producing a solid electrolytic capacitor as described in 40 or 41 above, wherein the oxidizing agent-containing solution is a suspension containing organic fine particles.

44. The method for producing a solid electrolytic capacitor as described in 43 above, wherein the average particle diameter ($D_{50}$) of the organic fine particles is from 0.1 to 20 μm.

45. The method for producing a solid electrolytic capacitor as described in 43 or 44 above, wherein the organic fine particle is at least one member selected from the group consisting of an aliphatic sulfonic acid compound, an aromatic sulfonic acid compound, an aliphatic carboxylic acid compound, an aromatic carboxylic acid compound, a salt thereof, and a peptide compound.

46. A solid electrolytic capacitor produced by the production method described in any one of 38 to 45 above.

Figure 19:

[FIG. 19] A cross-sectional photograph by an optical microscope (magnification: 500) of the chemically formed aluminum foil (anode substrate) of Example 8 in the direction of the thickness, wherein, the light color part and the dark color part respectively shows a valve-acting metal layer without pores and a layer having pores.

Figure 20:

[FIG. 20] A cross-sectional photograph by an optical microscope (magnification: 500) of the chemically formed aluminum foil (anode substrate) of Example 9 in the direction of the thickness, wherein, the light color part and the dark color part respectively shows a valve-acting metal layer without pores and a layer having pores.

Figure 21:
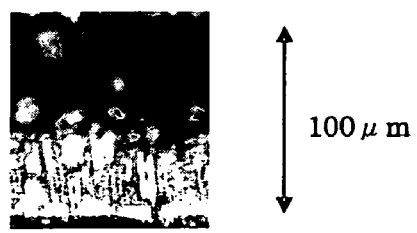

[FIG. 21] A photograph (magnification: 500) of the cut surface of the chemically formed aluminum foil (anode substrate) of Example 6 in the direction of the thickness, wherein, the light color part and the dark color part respectively shows a valve-acting metal layer without pores and a layer having pores.

Figure 22:
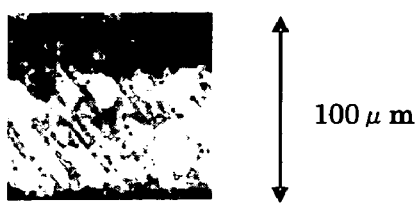

[FIG. 22] A photograph (magnification: 500) of the cut surface of the chemically formed aluminum foil (anode substrate) of Example 9 in the direction of the thickness, wherein, the light color part and the dark color part respectively shows a not chemically-formed part and chemically-formed part in the aluminum foil.

BEST MODE FOR CARRYING OUT THE INVENTION

The method of the present invention is described below by referring to the attached drawings.

The anode substrate of the present invention is produced by cutting obliquely a metal substrate comprising a valve-acting metal layer having fine pores and a valve-acting metal layer without fine pores and having a cut surface which is formed by elongation of the valve-acting metal layer without fine pores dragged by a cutting blade, typically a metal substrate comprising a valve-acting metal without fine pores in its core and a valve-acting metal layer having fine pores in the circumference, preferably in the form of a plate or foil.

Figure 1:
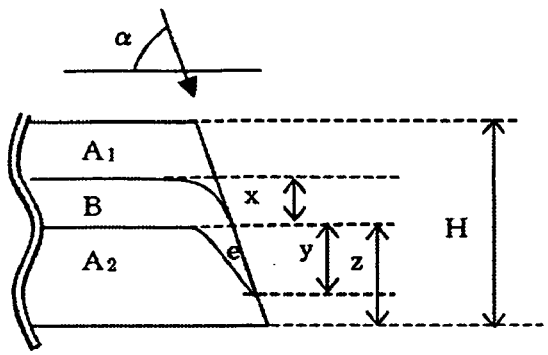
[FIG. 1] A cross-sectional view of an anode substrate.

A cross-sectional view in the direction of the thickness of the anode substrate as a typical example is shown in FIG. 1.

In FIG. 1, $A_1$ and $A_2$ are a valve-acting metal layer having fine pores, which hereinafter may be called "a fine pore layer", B is a valve-acting metal layer without fine pores and e is an elongated valve-acting metal layer having a cut surface formed by the elongation of layer B dragged by a cutting blade (hereinafter called "the layer of the elongated valve-acting metal"). Also, x is the original thickness, i.e., the thickness excluding the elongated part of the valve-acting metal layer without fine pores (layer B), y is the thickness of the layer of the elongated valve-acting metal (layer e) in the direction of the thickness of the substrate, z is the thickness of the valve-acting metal layer having fine pores (the side which is in contact with the layer of the elongated valve-acting metal, i.e., layer $A_2$) in the direction of the thickness of the substrate. When the anode substrate is cut in the direction of the arrow in FIG. 1, the end face of the relatively soft layer B is dragged and elongated along with the cutting blade, thereby generating an elongated layer having a cut surface formed as shown in FIG. 1.

The layer of the elongated valve-acting metal (or a burr) of the present invention does not substantially contain a valve-acting metal layer having pores and is a layer of the elongated valve-acting metal having a cut surface formed by the elongation of the valve-acting metal layer without pores dragged along with a cutting blade.

In the present invention, it is necessary for the layer of the elongated valve-acting metal, e, to meet the following formula:

$$0 \leq y/z \leq 1$$

preferably $0 \leq y/z \leq 1$, more preferably $0 \leq y/z \leq 0.95$ and still more preferably $0 \leq y/z \leq 0.90$.

Generally, with respect to a porous body having fine pores, a polymerized film is formed by making a monomer solution and an oxidizing agent solution deposited or absorbed into the pores existing on the surface of the porous body by the method of such as dipping or spraying of the solution to the surface; and by maintaining the status thereby to cause a chemical oxidative polymerization. However, with respect to a valve-acting metal layer without fine pores, a monomer solution and an oxidizing agent solution deposited onto the surface by dipping, spraying or the like aggregate locally due to its smooth surface, and the aggregated solutions run off in droplets and cannot be maintained on the surface. Therefore, it has been found that a chemical oxidative polymerization does not proceed efficiently. The grooves on the surface of the cut surface generated in the present invention have been found effective in improving the ability of retaining solutions on the surface by roughening the smooth surface of the valve-acting metal layer without fine pores and thereby forming a polymerized film efficiently on the surface of the valve-acting metal without fine pores or on a corner part, which was difficult under the conventional method. The cut surface formed in the present invention includes the cut surface of the elongated valve-acting metal layer without fine pores.

That is, the valve-acting metal layer without fine pores in the anode substrate containing a valve-acting metal layer having fine pores and that without fine pores preferably possess grooves on the cut surface formed by elongation due to being dragged along with a cutting blade at cutting, more preferably grooves located obliquely or parallel to the direction of the short axis of the cut surface. Specifically, the oblique or parallel grooves are located preferably in the range of from 0° or more to 80° or less, more preferably in the range of from 0° or more to 45° or less, still more preferably in the range of from 0° or more to 30° or less to the direction of the short axis of the cut surface. If the oblique or parallel grooves are located at an angle exceeding 80° to the direction of the short axis of the cut surface, it is not preferable since it lowers the ability of retaining solutions on the metal surface.

In the present invention, the width of the grooves formed on the cut surface is preferably 0.1 to 1000 μm, more preferably 0.1 to 100 μm, and most preferably 0.1 to 10 μm. The grooves exceeding 1000 μm in width are not preferable because they are too wide to expect effects on improving the ability to retain solutions. If the width of the grooves is less than 0.1 μm, it is not preferable because the surface becomes substantially equal to a smooth surface.

In the present invention, the pitch between the grooves formed on the cut surface is preferably 0.1 to 1000 μm, more preferably 0.1 to 100 μm, and most preferably 0.1 to 10 μm. The grooves exceeding 1000 μm in pitch are not preferable because the space between the grooves becomes too wide to expect synergistic effects in retaining solutions which enhances as the number of grooves increases. If the pitch of the grooves is less than 0.1 μm, it is not preferable because the surface becomes substantially equal to a smooth surface.

In the present invention, the depth of the grooves formed on the cut surface is, though it varies depending on the thickness of the anode substrate and cannot be generally specified, preferably in the range of from 0.1 to 100 μm, more preferably from 0.1 to 10 μm. Also, the depth of the grooves is preferably from 1 to 10% of the thickness of the anode substrate.

The grooves on the cut surface formed in the present invention can be formed by forming desired minute grooves on the disk-shaped blade unit to be used to cut the surface. Further, the grooves can also be formed by attaching fine powder on the surface of a blade of the disk-shaped blade unit. The grooves of the blade used for producing the anode substrate of the present invention are formed preferably on the outer circumference or the edge part formed between the outer circumference and disk plane.

The width of the grooves of the blade used for producing the anode substrate of the present invention is preferably from 0.1 to 100 μm, more preferably from 0.1 to 10 μm.

The pitch between the grooves of the blade used for producing the anode substrate of the present invention is preferably from 0.1 to 100 μm, more preferably from 0.1 to 10 μm.

The depth of the grooves of the blade used for producing the anode substrate of the present invention is preferably from 0.01 to 10 μm, more preferably from 0.1 to 1 μm. Also, the depth of the grooves is preferably in the range of from 0.01 to 5% of the thickness of the anode substrate.

Figure 10:
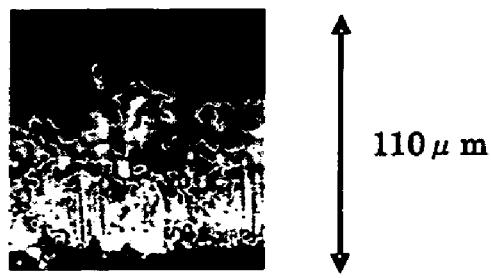
[FIG. 10] A cross-sectional photograph by an optical microscope (magnification: 500) of the chemically formed aluminum foil of Example 1.

Further, the grooves on the cut surface of the anode substrate can also be formed by attaching fine powder on the surface of the blade of the disk-shaped blade unit. FIG. 10 is an enlarged photograph of the cut surface of a structure wherein the grooves formed by cutting with a powder-attached blade exist on the cut surface of a chemically formed aluminum foil. Specifically, the powder used in the present invention is preferably the same material with that constituting the anode substrate, more preferably, an oxide or nitride thereof. In the case where the substrate is made of aluminum, the examples of the powder include an aluminum oxide (alumina) or aluminum powder having an oxide layer on the surface thereof. In the case where the substrate is made of tantalum, niobium or the like, the examples of the powder include tantalum oxide, niobium oxide or the like.

When cutting the anode substrate by attaching fine powder on the surface of the blade of the disk-shaped blade unit, there are some cases where the size of the grooves partially becomes larger than the particle size of the powder to be used since the powder makes secondary powder by aggregation. However, the powder can be used without problems in the present invention.

The size of a secondary particle or a primary particle of the powder used in the present invention is preferably in the range of from 0.01 to 10 μm, more preferably in the range of 0.01 to 1 μm.

The valve-acting metal which can be used in the present invention is a single metal such as aluminum, tantalum, niobium, titanium, zirconium, magnesium and silicon, or an alloy thereof and among these, aluminum is particularly preferable. The morphology of the porous material may be any of a porous shaped body such as an etched product of a rolled foil and a sintered body of fine powder.

With respect to the anode substrate, the above-described metal may be used in the form of, for example, a porous sintered body, a plate (including ribbon, foil, etc.) or a wire surface-treated by etching or the like. The anode substrate is preferably a plate-like or foil-like material, more preferably, a chemically formed aluminum foil cut into rectangles by a cutting machine.

The thickness (H) of the valve-acting metal foil varies depending on, for example, the use end, but a foil having a thickness of about 40 to 300 μm is usually used. In order to produce a thin solid electrolytic capacitor, for example, in the case of an aluminum foil, it is preferred to use an aluminum foil having a thickness of 80 to 250 μm and set the maximum height of an element having provided therein a solid electrolytic capacitor to 250 μm or less. The size and the shape of the metal foil also vary depending on the use end, but the metal foil preferably has, in terms of a plate-like element unit, a rectangular shape with a width of approximately from 1 to 50 mm and a length of approximately from 1 to 50 mm, more preferably a width of approximately from 2 to 15 mm and a length of approximately from 2 to about 25 mm.

The method to fulfil the above-mentioned conditions in such an anode substrate includes the following methods, for example, but the present invention is not limited thereto.

(1) Cutting an anode substrate so as to make the inner angle between the edges of the anode substrate surface from which cutting starts and of the cut surface (i.e., the supplementary angle of cutting angle α shown in FIG. 1) more than 90° to 135° or less.

(2) When a protruded part of the elongated valve-acting metal layer is generated, cutting the protruded part.

(3) When a protruded part of the elongated valve-acting metal layer is generated, chamfering the edges including the protruded part.

(4) When a protruded part of the elongated valve-acting metal layer is generated, eliminating the protrusion by pressing a shaping form to the edges including the protruded part.

The above methods (1) to (3) can be performed, for example, by using a cutting machine with a double-edged blade. Specifically, method (1) can be implemented by using a slitter wherein plural disk-shaped blade units each comprising a thick and thin blades are provided alternately with a minute gap between each other, thereby enabling cutting between a thin blade of one disk-shaped blade and a thick blade of another disk-shaped blade, and by adjusting the space between the disk-shaped blades so that the original sheet of an anode substrate passing between the unit of the alternately provided disk-shaped blades can be ejected to a direction with a tilt angle of 1° to 15° against the cutting direction of the blade.

A solid electrolytic capacitor containing an anode substrate is described below, wherein at least a part of the edges of the anode substrate is chamfered including the chamfering of the edges including the protruded part performed in above (3).

In the present invention, an anode substrate for a solid electrolytic capacitor does not have a corner part of an angle of 90° or less in a cross-sectional view in the direction of the thickness, or the angle of 90° or less in a corner region is reduced. That is, as indicated in broken line in FIG. 11, in a conventional anode substrate for a solid electrolytic capacitor, the corner part in a cross-sectional view in the direction of the thickness substantially forms a right angle, while the corner of the anode substrate of the present invention has a chamfered shape as shown in solid line in FIG. 11. As a result, angle a or b at a corner part of the anode substrate becomes more than 90° and less than 180°. In the scope of the present specification and the claims attached thereto, "a chamfered anode substrate" has only to possess a shape obtained by an operation of "chamfering", including not only an anode substrate obtained by an actual "chamfering" operation but also one attaining such a shape by some kind of shaping.

Chamfering may be performed on all the edges of an anode substrate, or may be performed only on the corner part between the upper surface and the side surface (end surface)

Figure 11:
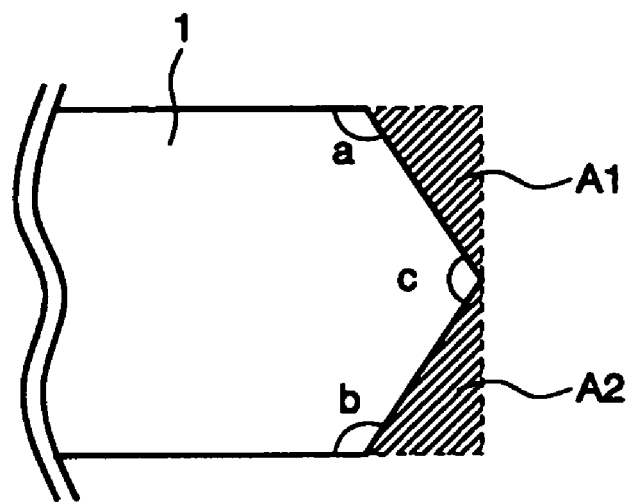
[FIG. 11] A partial cross-sectional view showing the structure of an anode substrate for a solid electrolytic capacitor according to one embodiment of the present invention (in solid line) in contrast with that of a conventional example (in broken line).

(A1 in FIG. 11) or on the corner part between the lower surface and the side surface (end surface) (A2 in FIG. 11). Also, chamfering may be performed only on the corner part between the upper and lower surfaces and the side surface or on the corner part between the upper and lower surfaces and the end surface of the anode substrate. Or chamfering may be performed only on a part of these corner parts. Here, the "side surface" means a surface along with the longer edge of the anode substrate (a side vertical to the solution level in the production process of a solid electrolytic capacitor to be described hereinafter), and the "end surface" means a surface along with the shorter edge of the anode substrate (a side to be dipped horizontally to the solution level in the dipping step in the production process of a solid electrolytic capacitor to be described hereinafter).

Preferably, chamfering is performed all over the area where a solid electrolyte layer is formed.

Figure 12:
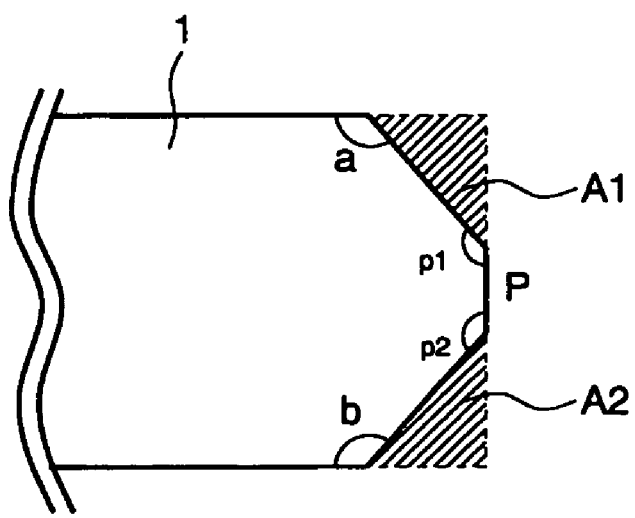
[FIG. 12] A partial. cross-sectional view showing the structure of an anode substrate for a solid electrolytic capacitor according to another embodiment of the present invention (in solid line) in contrast with that of a conventional example (in broken line).

In the present invention, the anode substrate varies in the cross-sectional shape obtained by chamfering. The chamfering is typically performed so that the anode substrate has a cross-sectional shape of a wedge in the direction of thickness of the anode substrate, and the angle of one of the three corners constituting the wedge is from 90° or more to less than 180° and the angle of the other two corners is from more than 90° and less than 180°. For example, chamfering may be performed to form a triangle abc as the cross-sectional shape in the direction of thickness as shown in FIG. 11, or may be performed to form a trapezoid abP (p1, p2) as the cross-sectional shape in the direction of thickness as shown in FIG. 12. In this case, face P may be the rest of the original side surface (or end surface) existing before chamfering, or may be formed by chamfering the cross-sectional shape so as to make it a triangle abc as shown in FIG. 11, followed by further chamfering tip c of the triangle.

Figure 13:
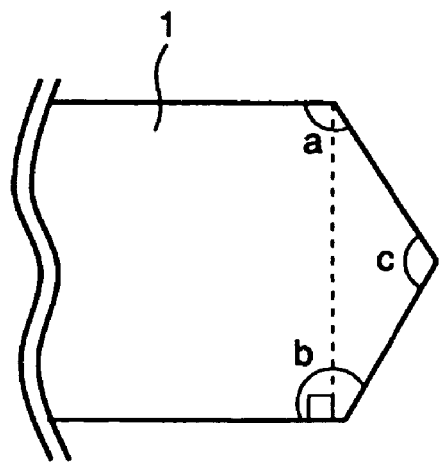
[FIG. 13] A partial cross-sectional view showing the structure of an anode substrate for a solid electrolytic capacitor according to one embodiment of the present invention.

In the case where the cross-sectional shape is a triangle abc (FIG. 13: removing the shaded portions of FIG. 11), tip angle c is preferably 90° or more and less than 180°, more preferably, more than 90° and less than 180°. In FIGS. 12 and 13, angles a and b may be the same or different. Angles a and b of the corners constituting the wedge is preferably from more than 90° and less than 180° respectively, and angle c is preferably from 90° or more and less than 180°.

In the examples shown in FIGS. 11 to 13, a perpendicular line dropped from the top of corner part a at the upper surface to the lower surface may intersect at corner part b. Furthermore, the present invention also includes the case where a perpendicular line from the top of corner part a at the upper surface to the lower surface does not intersect at corner part b (the case when x>0 in FIG. 14). Also, the present invention includes the case where a perpendicular line from the top of corner part a does not intersect at corner part f and y>0 (FIG. 15). The thus-obtained cross-sectional shape includes a convex polygon of a trigona or more, each angle constituting the above-described wedge shape is not less than 90° and less than 180° (except the case where the convex polygon is quadrangle wherein the angle of all of the corners is 90°).

Figure 14:
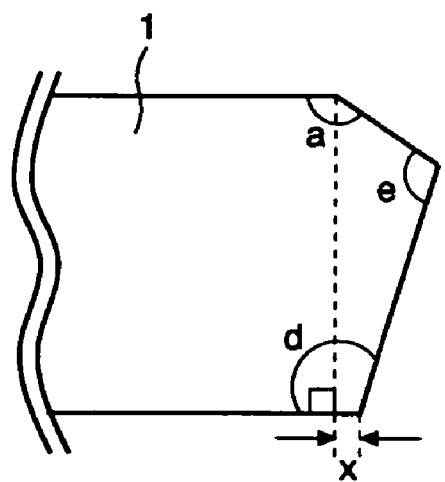
[FIG. 14] A partial cross-sectional view showing the structure of an anode substrate for a solid electrolytic capacitor according to another embodiment of the present invention.
Figure 15:
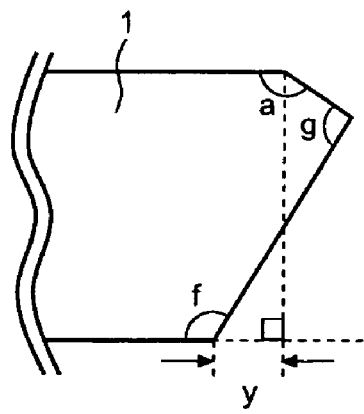
[FIG. 15] A partial cross-sectional view showing the structure of an anode substrate for a solid electrolytic capacitor according to still another embodiment of the present invention.

In the case of FIG. 14, when the illustrated cut surface part treated with chamfering is "a side surface" in the above-mentioned meaning, the width of the lower surface of the anode substrate is larger by x in one side than that of the upper surface (the other side face not shown in the figure may be chamfered in the same way, and in this case the width of the lower surface becomes larger than that of the upper surface by 2x in total of both sides). When the illustrated part in FIG. 14 is "an end surface" in the above-mentioned meaning, the length of the lower surface of the anode substrate is larger by x in one end than that of the upper surface. In FIG. 14, preferably angles a and e constituting the wedge-shape are from more than 90° and less than 180° respectively, angle d is from 90° or more and less than 180° and x>0.

In FIG. 15, when the illustrated part is "a side surface" in the above-mentioned meaning, the width of the lower surface of the anode substrate is smaller by y in one side than that of the upper surface (the other side face not shown in the figure may be chamfered in the same way, and in this case the width of the lower surface becomes smaller than that of the upper surface by 2y in total of both sides). When the illustrated part in FIG. 15 is "an end surface" in the above-mentioned meaning, the length of the lower surface of the anode' substrate is smaller by y in one end than that of the upper surface. In FIG. 15, preferably angles a and f constituting the wedge-shape are from more than 90° and less than 180° respectively, angle g is from 90° or more and less than 180° and y>0.

In a similar manner as angle c in FIG. 11 is further chamfered in FIG. 12, any of angles a, b, c, d, e, f and g may be further chamfered, and the angles newly generated by chamfering may also be chamfered. However, as the anode substrate is usually several tens to hundreds μm in thickness, the shape in FIGS. 11 to 15 is practical.

The shape obtained by chamfering may be the same or different on respective edges.

An anode substrate as mentioned above can be produced, for example, through chamfering by pressing a cutter obliquely to an edge of an anode substrate. Both of the upper and lower edges may be chamfered at the same time by pressing cutters from above and beneath the anode substrate simultaneously.

With respect to a side surface, a chamfered shape may be obtained by producing an intermediate product of an anode substrate wherein the angle inside the edges of the upper surface and the cut surface is more than 90° by pressing a slitter obliquely to the original sheet of the anode substrate, and consequently by performing cutting by pressing a cutter obliquely to the edge of the lower surface of the intermediate product so that the angle inside the edges of the lower surface and the cut surface made by the slitter becomes more than 90°, or may be by the reverse way (i.e., by, cutting the original sheet of the anode substrate by pressing a slitter from the lower surface and then chamfering the upper face of the thus-obtained intermediate product). Also, the anode substrate may be cut by using a slitter wherein plural disk-shaped blade units each comprising a thick blade and a thin blade are provided alternately with a minute gap between each other, thereby enabling cutting between a thin blade of one disk-shaped blade unit and a thick blade of another disk-shaped blade unit, and by adjusting the gap between the blade units so that the original sheet of an anode substrate passing between the units of the alternately provided disk-shaped blades can be ejected to a direction with a tilt angle of 1° to 15° against the cutting direction of the blade.

The anode substrate having a wedge shape of the present invention can be produced by abrading the cut side surface of the anode substrate in a shape of a ribbon or a hoop reeled in a certain amount. Specifically, the anode substrate can be produced by chamfering the side surface of a chemically formed foil by pressing it to the abrading agent existing on the surface of an elastic support substrate. In an anode substrate comprising of a valve-acting metal layer without fine pores sandwiched between porous valve-acting metal layers having fine pores, the valve-acting metal layer having fine pores is more fragile than and inferior in strength to the valve-acting metal layer without fine pores. Accordingly, it has been found that the valve-acting layers having fine pores are abraded selectively when pressed to an abrading agent, which enables to form a wedge-shaped side surface of the present invention. For chamfering, it is preferable to use an abrading agent existing on the surface of an elastic support substrate. That is, by using an elastic support substrate, the substrate creeps at a valve-acting metal layer without fine pores having a higher intensity as a vertex, and thereby valve-acting metal layers having fine pores existing on the both sides of the valve-acting metal layer without fine pores are abraded preferentially. When a cut surface of the chemically formed foil is pressed to an abrading agent existing on the surface of an inelastic support substrate, the valve-acting metal layer without fine pores becomes elongated, which is not preferable.

Particularly, when abrading an anode substrate reeled in a hoop, the abrading agent to be used is preferably No. from 120 to 2400, more preferably from No. 320 to 500. The abrading can be performed by abrading using an abrading agent existing in a rotating substrate such as a single-action or double-action grinder, and a double-action abrading is preferable. Double-action abrading is specifically preferable since it can erase weaving of a hoop material so that the whole anode substrate can be abraded evenly without the elongation of a valve-acting metal layer without fine pores.

The method of forming the grooves on the surface of the valve-acting layer without fine pores simultaneously with the abrading of the side surface of the anode substrate is efficient and preferable. However, in the case that desired grooves cannot be formed by abrading the side surface, the abrading for forming the grooves may be separately performed. Particularly, in order to shorten the period of time required for abrading, it may be more efficient in some cases to separately form the grooves on the abraded surface. Specifically, in the case where there is great weaving in a hoop material, which requires much amount of abrading, the method of separately performing abrading for forming grooves is selected preferably.

Figure 2:
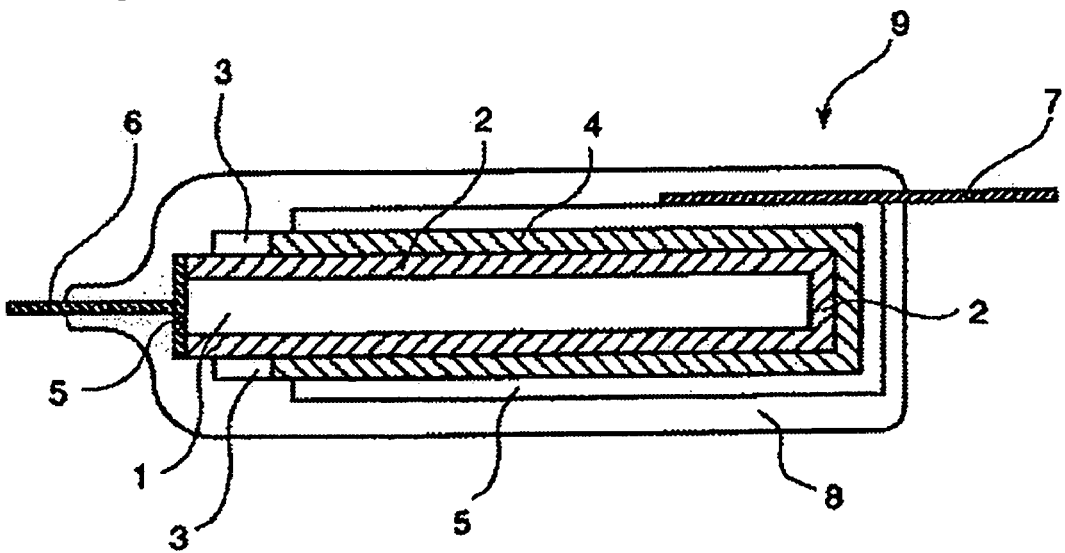
[FIG. 2] A cross-sectional view showing an example of the solid electrolytic capacitor using a capacitor element.

The present invention further provides a solid electrolytic capacitor comprising the above-mentioned anode substrate. A typical structure is shown in FIG. 2., wherein the dielectric film (2) on the surface of a substrate (1) is usually formed by subjecting a porous shaped body of a valve-acting metal to a chemical forming treatment and a solid electrolyte (4) (cathode part) is further formed.

As for the method of forming a dielectric oxide film on the surface of this metal porous body, a known method may be used. For example, in the case of using an aluminum foil, the oxide film can be formed by anodizing the aluminum foil in an aqueous solution containing boric acid, phosphoric acid, adipic acid, a sodium or ammonium salt thereof or the like. In the case of using a sintered body of tantalum powder, the oxide film can be formed thereon by anodizing the sintered body in an aqueous phosphoric acid solution.

The chemical formation solution and the chemical formation conditions (e.g., chemical formation voltage) for use in the chemical formation are previously confirmed by an experiment and set to appropriate values according to the capacitance, breakdown voltage and the like required for the solid electrolytic capacitor produced. At the chemical formation treatment, a masking (3) is generally provided for preventing the chemical formation solution from being soaked up to the portion which will serve as the anode of the solid electrolytic capacitor and at the same time, for ensuring the insulation of the anode from the solid electrolyte (4) (cathode part) which is formed in the later step.

As for the masking material, for example, a composition comprising a general heat-resistant resin, preferably a solvent-soluble or solvent-swellable heat-resistant resin or a precursor thereof, and also comprising an inorganic fine powder and a cellulose-based resin may be used, but the material is not limited. Specific examples thereof include a polyphenyl-sulfone (PPS), a polyether-sulfone (PES), a cyanate ester resin, a fluororesin (e.g., tetrafluoroethylene, tetrafluoroethylene-perfluoroalkyl vinyl ether copolymer), a low molecular polyimide, and a derivative or a precursor thereof. Among these, preferred are low molecular polyimide, polyethersulfone, fluororesin, and a precursor thereof.

The present invention is based on the chemical oxidative polymerization of an organic polymerizable monomer, comprising a step of dipping a valve-acting metal porous substrate in an oxidizing agent solution, and then drying it to gradually elevate the concentration of the oxidizing agent solution on the substrate. In the chemical oxidative polymerization method of the present invention, a monomer is attached on the dielectric film having fine pores on the anode substrate, oxidative polymerization is caused in the presence of a compound capable of serving as a dopant to an electrically conducting polymer, and the produced polymer composition is formed as the solid electrolyte on the dielectric surface. The solid electrolyte layer of an electrically conducting polymer produced by the method of the present invention has a fibril structure or a lamella (thin layer-like) structure. These structures have widespread over-lapping among the polymer chains. In the present invention, it has been found that when the thickness of the entire solid electrolyte layer is from about 10 to about 100 µm, the space in the layer structure of polymer is from 0.01 to 5 µm, preferably from 0.05 to 3 µm, more preferably from 0.1 to 2 µm, and the percentage occupancy of space between layers of the solid electrolyte in the entire polymer film is from 0.1 to 20%, electron hopping between polymer chains is facilitated and the electric conductivity as well as properties such as low impedance are enhanced.

The method of forming a solid electrolyte layer on the dielectric film formed on the valve-acting metal surface having fine pores in the present invention is described step by step below.

In the present invention, Step 1 of dipping the valve-acting metal in a monomer containing solution, followed by drying, is performed to supply a monomer on the dielectric surface and on the polymer composition. After impregnating with the monomer-containing solution to uniformly attach the monomer on the dielectric surface and on the polymer composition, the valve-acting metal substrate is left standing in air for a certain time to vaporize the solvent. At this time, the conditions vary depending on the kind of the solvent, but the evaporation is generally performed at a temperature from 0° C. to the boiling point of the solvent. The standing time varies depending on the kind of the solvent but is generally from 5 seconds to 15 minutes. For example, in the case of an alcohol-based solvent, standing of 5 minutes or less may be sufficient. With this standing time, the monomer can be uniformly attached on the dielectric surface and contamination can be reduced at the next step of dipping the valve-acting metal in an oxidizing agent-containing solution.

The supply of the monomer can be controlled by the kind of the solvent used in the monomer-containing solution, the concentration of the monomer-containing solution, the temperature of the solution, the dipping time and the like.

The dipping time in Step 1 is from a time long enough to allow for attachment of the monomer component in the monomer-containing solution on the dielectric surface of the metal foil substrate to less than 15 minutes, preferably from 0.1 second to 10 minutes, more preferably from 1 second to 7 minutes.

The dipping temperature is preferably from −10 to 60° C., more preferably from 0 to 40° C. If the dipping temperature is lower than −10° C., volatilization of the solvent takes time and the reaction time is disadvantageously prolonged, whereas if it exceeds 60° C., volatilization of the solvent and the monomer cannot be neglected and the concentration control becomes difficult.

The monomer-containing solution is not particularly limited in the concentration and may have an arbitrary concentration, but in view of excellent impregnation into fine pores of the valve-acting metal, the concentration is preferably from 3 to 70 mass %, more preferably from 25 to 45 mass %.

Examples of the solvent usable for the solution used in Step 1 include ethers such as tetrahydrofuran (THF), dioxane and diethylether; ketones such as acetone and methyl ethyl ketone; aprotic polar solvents such as dimethylformamide, acetonitrile, benzonitrile, N-methylpyrrolidinone (NMP) and dimethylsulfoxide (DMSO); esters such as ethyl acetate and butyl acetate; non-aromatic chlorine-based solvents such as chloroform and methylene chloride; nitro compounds such as nitromethane, nitroethane and nitrobenzene; alcohols such as methanol, ethanol and propanol; water; and a mixed solvent thereof. Among these, preferred are alcohols, ketones and a mixed system thereof.

In the present invention, the monomer is oxidatively polymerized in Step 2 of dipping the valve-acting metal in an oxidizing agent-containing solution and holding it in air within a predetermined range of temperature for a predetermined time. In order to form a polymerization film with more dense morphology, a method in which the oxidative polymerization is predominately performed during holding in air is preferred. The temperature at the holding in air varies depending on the kind of the monomer but, for example, in the case of pyrrole, the temperature may be 5° C. or less and in the case of a thiophene-based monomer, the temperature needs to be approximately from 30 to 60° C.

The polymerization time depends on the coverage of the monomer at the dipping. The coverage varies depending on the concentration, viscosity or the like of the monomer-containing or oxidizing agent-containing solution and cannot be unequivocally specified, but in general, the polymerization time can be shortened with a thin coverage per once and the polymerization takes a long time with a thick coverage per once. In the method of the present invention, the polymerization time per once is from 10 seconds to 30 minutes, preferably from 3 to 15 minutes.

The dipping time in Step 2 is from a time long enough to allow for attachment of the oxidizing agent component on the dielectric surface of the metal foil substrate to less than 15 minutes, preferably from 0.1 second to 10 minutes, more preferably from 1 second to 7 minutes.

The oxidizing agent used in Step 2 includes an aqueous-solution-type oxidizing agent and an organic solvent-type oxidizing agent. Examples of the aqueous solution-type oxidizing agent preferably used in the present invention include peroxodisulfuric acid and Na, K and $NH_4$ salts thereof, cerium(IV) nitrate, ceric(IV) ammonium nitrate, iron(III) sulfate, iron(III) nitrate and iron(III) chloride. Examples of the organic solvent-type oxidizing agent include a ferric salt of an organic sulfonic acid, such as iron(III) dodecylbenzenesulfonate and iron(III) p-toluenesulfonate.

Examples of the solvent for the solution used in Step 2 of the present invention include ethers such as tetra-hydrofuran (THF), dioxane and diethylether; ketones such as acetone and methyl ethyl ketone; aprotic polar solvents such as dimethylformamide, acetonitrile, benzonitrile, N-methylpyrrolidinone (NMP) and dimethylsulfoxide (DMSO); alcohols such as methanol, ethanol and propanol; water; and a mixed solvent thereof. Among these, preferred are water, alcohols, ketones and a mixed system thereof.

The concentration of the oxidizing agent solution is preferably from 5 to 50 mass %, and the temperature of the oxidizing agent solution is preferably from −15 to 60° C.

In Step 2, a suspension containing organic fine particles is preferably used. The organic fine particle remains on the dielectric surface or polymer composition and effectively promotes the supply of the oxidizing agent or monomer to the smooth polymerization film surface after the pore is filled with a polymerization film. In particular, when soluble organic fine particles are used, they can be dissolved and removed after the formation of the solid electrolyte layer and the reliability of the capacitor element can be enhanced.

Examples of the solvent used in the process of dissolving and removing organic fine particles include water; alcohols such as methanol, ethanol and propanol; ketones such as acetone and methyl ethyl ketone; and an aprotic polar solvent such as dimethylformamide, N-methyl-2-pyrrolidinone and dimethylsulfoxide. Among these, water, alcohols, and a mixed solvent thereof are preferred. A solvent capable of dissolving the oxidizing agent as well is more preferred, because the removal of the oxidizing agent can be simultaneously effected.

A soluble inorganic fine particle removable with use of a strong acid causes damage such as dissolution or corrosion also of the dielectric film on the valve-acting metal surface and therefore, is not preferred.

The soluble organic fine particle preferably has an average particle diameter ($D_{50}$) of 0.1 to 20 μm, more preferably from 0.5 to 15 μm. If the average particle diameter ($D_{50}$) of the soluble organic fine particle exceeds 20 μm, the gap formed in the polymer film disadvantageously becomes large, whereas if it is less than 0.1 μm, the effect of increasing the amount of solution attached is not obtained and becomes equal to that of water.

Specific examples of the soluble organic fine particle include an aliphatic sulfonic acid compound, an aromatic sulfonic acid compound, an aliphatic carboxylic acid compound, an aromatic carboxylic acid compound, a peptide compound, and/or a salt thereof. Among these, preferred are an aromatic sulfonic acid compound, an aromatic carboxylic acid compound and a peptide compound.

Specific examples of the aromatic sulfonic acid compound include benzenesulfonic acid, toluenesulfonic acid, naphthalenesulfonic acid, anthraquinonesulfonic acid, and/or a salt thereof; specific examples of the aromatic carboxylic acid compound include benzoic acid, toluenecarboxylic acid, naphthalenecarboxylic acid, anthracenecarboxylic acid, anthraquinonecarboxylic acid, and/or a salt thereof; and specific examples of the peptide compound include surfactin, iturin, plipastatin and serrawettin.

In the present invention, the number of impregnations needs to be controlled so as to form an electrically conducting polymer composition having a thickness large enough to be resistant to humidity, heat, stress and the like.

One preferred process of forming solid electrolyte according to the present invention is a method of repeating the steps of Step 1 and Step 2 as one cycle. This cycle is repeated 3 times or more, preferably from 8 to 30 times, for one anode substrate, whereby a desired solid electrolyte layer can be formed. Incidentally, the order of Step 1 and Step 2 may be reversed.

According to the present invention, as described in Examples later, an aluminum foil having thereon a dielectric oxide film is dipped, for example, in an isopropyl alcohol (IPA) solution of 3,4-ethylenedioxythiophene (EDT), air-dried to mostly remove the IPA, dipped in an aqueous solution containing about 20 mass % of an oxidizing agent (ammonium persulfate) and then heated at about 40° C. for 10 minutes, or this procedure is repeated, whereby a polymer of poly (3,4-ethylenedioxythiophene) can be obtained.

The electrically conducting polymer for forming the solid electrolyte for use in the present invention is a polymer of an organic polymer monomer having a π-electron conjugated structure. The polymerization degree is from 2 to 2,000, preferably from 3 to 1,000, more preferably from 5 to 200. Specific examples thereof include an electrically conducting polymer containing, as a repeating unit, a structure shown by a compound having a thiophene skeleton, a compound having a polycyclic sulfide skeleton, a compound having a pyrrole skeleton, a compound having a furan skeleton, or a compound having an aniline skeleton.

Examples of the monomer having a thiophene skeleton include a derivative such as 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylenethiophene, 3,4-methylenedioxythiophene and 3,4-ethylenedioxythiophene. Generally such a compound may be a commercially available compound or may be prepared by a known method (see, for example, Synthetic Metals, Vol. 15, page 169 (1986)).

Specific examples of the monomer having a polycyclic sulfide skeleton include a compound having a 1,3-dihydropolycyclic sulfide (also called 1,3-dihydrobenzo[c]thiophene) skeleton, and a compound having a 1,3-dihydronaphtho[2,3-c]thiophene skeleton. Other examples include a compound having a 1,3-dihydroanthra[2,3-c]thiophene skeleton, and a compound having a 1,3-dihydronaphthaceno[2,3-c]thiophene skeleton. Such a compound can be prepared by a known method, for example, the method described in JP-A-8-3156.

In addition, for example, a 1,3-dihydro-phenanthra[2,3-c]thiophene derivative as a compound having a 1,3-dihydronaphtho[1,2-c]thiophene skeleton, and a 1,3-dihydrobenzo[a]anthraceno[7,8-c]thiophene derivative as a compound having a 1,3-dihydrotriphenylo[2,3-c]thiophene skeleton can be used.

A compound optionally containing nitrogen or N-oxide in the condensed ring may also be used and examples thereof include 1,3-dihydrothieno[3,4-b]quinoxaline, 1,3-dihydrothieno[3,4-b]quinoxaline-4-oxide and 1,3-dihydrothieno[3,4-b]quinoxaline-4,9-dioxide.

Specific examples of the monomer having a pyrrole skeleton include a derivative such as 3-methylpyrrole, 3-ethylpyrrole, 3-propylpyrrole, 3-butylpyrrole, 3-pentyl-pyrrole, 3-hexylpyrrole, 3-heptylpyrrole, 3-octylpyrrole, 3-nonylpyrrole, 3-decylpyrrole, 3-fluoropyrrole, 3-chloro-pyrrole, 3-bromopyrrole, 3-cyanopyrrole, 3,4-dimethyl-pyrrole, 3,4-diethylpyrrole, 3,4-butylenepyrrole, 3,4-methylenedioxypyrrole and 3,4-ethylenedioxypyrrole. Such a compound may be a commercially available product or may be prepared by a known method.

Specific examples of the monomer having a furan skeleton include a derivative such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylene-dioxyfuran. Such a compound may be a commercially available product or may be prepared by a known method.

Specific examples of the monomer having an aniline skeleton include a derivative such as 2-methylaniline, 2-ethylaniline, 2-propylaniline, 2-butylaniline, 2-pentyl-aniline, 2-hexylaniline, 2-heptylaniline, 2-octylaniline, 2-nonylanilin, 2-decylaniline, 2-fluoroaniline, 2-chloro-aniline, 2-bromoaniline, 2-cyanoaniline, 2,5-dimethyl-aniline, 2,5-diethylaniline, 2,3-butyleneaniline, 2,3-methylenedioxyaniline and 2,3-ethylenedioxyaniline. Such a compound may be a commercially available product or may be prepared by a known method.

Among these, the compounds having a thiophene or polycyclic sulfide skeleton are preferred, and 3,4-ethylenedioxythiophene (EDT) and 1,3-dihydroisothia-naphthene are more preferred.

The polymerization conditions and the like of the compound selected from the group consisting of the above-described compounds are not particularly limited and the polymerization may be easily performed after previously confirming the preferred conditions by a simple experiment.

Also, compounds selected from the group consisting of the above-described monomers may be used in combination and the solid electrolyte may be formed as a copolymer. In this case, the compositional ratio and the like of polymerizable monomers depend on, for example, the polymerization conditions and the preferred compositional ratio and polymerization conditions may be confirmed by a simple test.

For example, a method in which an EDT monomer and an oxidizing agent each preferably in the form of a solution are coated separately one after another or coated simultaneously on an oxide film layer of a metal foil to form a solid electrolyte, may be used (see, Japanese Patent 3,040,113 and U.S. Pat. No. 6,229,689).

The 3,4-ethylenedioxythiophene (EDT) preferably used in the present invention is well soluble in the above-described monohydric alcohol but low in the affinity for water and therefore, on contacting with an aqueous solution containing an oxidizing agent at a high concentration, the polymerization of EDT successfully proceeds on the interface thereof and an electrically conducting polymer as a solid electrolyte layer having a fibril structure or a lamella (thin layer-like) structure is formed.

Examples of the solvent for washing after the formation of the solid electrolyte, which can be used in the production method of the present invention, include ethers such as tetrahydrofuran (THF), dioxane and diethylether; ketones such as acetone and methyl ethyl ketone; aprotic polar solvents such as dimethylformamide, acetonitrile, benzonitrile, N-methylpyrrolidinone (NMP) and dimethylsulfoxide (DMSO); esters such as ethyl acetate and butyl acetate; a non-aromatic chlorine-based solvent such as chloroform and methylene chloride; a nitro compound such as nitromethane, nitroethane and nitrobenzene; alcohols such as methanol, ethanol and propanol; an organic acid such as formic acid, acetic acid and propionic acid; an acid anhydride of the organic acid (e.g., acetic anhydride); water; and a mixed solvent thereof. Among these, preferred are water, alcohols, ketones and a mixed system thereof.

The thus-produced solid electrolyte has an electric conductivity of about 0.1 to about 200 S/cm, preferably from about 1 to about 150 S/cm, more preferably from about 10 to about 100 S/cm.

On the electrically conducting polymer composition layer formed in this way, an electrically conducting layer is preferably provided so as to attain good electric contact with the cathode lead terminal. The electrically conducting layer is formed, for example, by coating an electrically conducting paste, applying plating or vapor deposition, or laminating an electrically conducting resin film.

In the present invention, the electrically conducting layer formed may be compressed. For example, in the case of an electrically conducting layer containing an elastic material, the compression has an effect of causing plastic deformation to render the layer thinner and also smoothing the electrically conducting layer surface.

Figure 3:
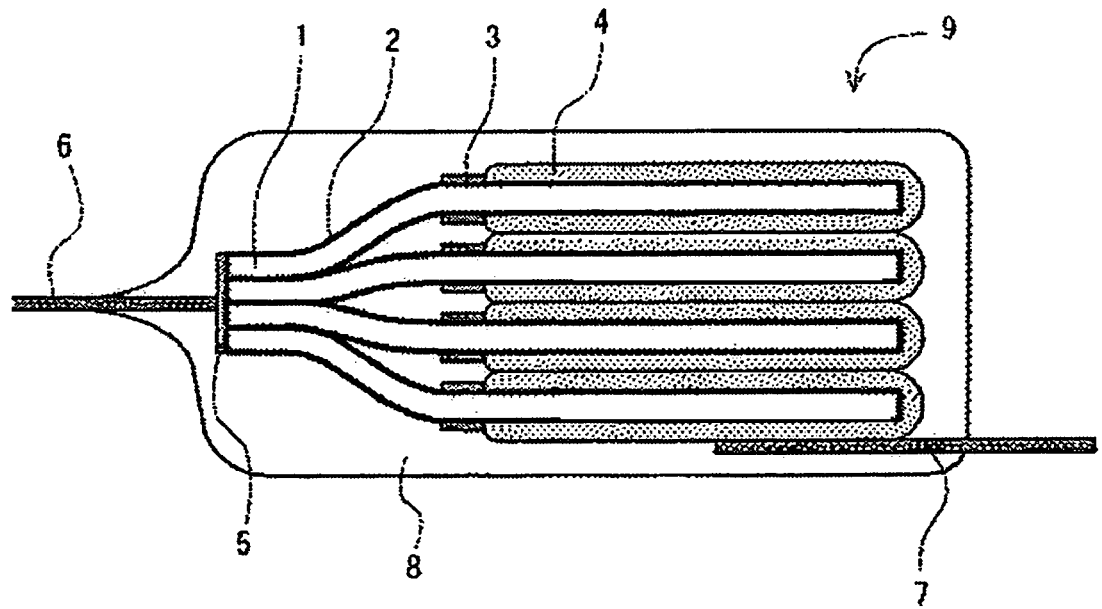
[FIG. 3] A cross-sectional view showing an example of the solid electrolytic capacitor obtained by stacking capacitor elements.

As shown in FIG. 3, usually, a solid electrolytic capacitor product for various uses (9) is made from the thus-obtained solid electrolytic capacitor elements by laminating a plurality thereof, connecting an anode lead wire (6) to an anode terminal and a cathode lead wire (7) to an electrically conducting layer (not shown in the figure) on a solid electrolytic layer (4), respectively, and then jacketing the whole, for example, with a resin mold (8), a resin case or a metal-made jacket case or by resin dipping.

EXAMPLES

The present invention is described in greater detail below by referring to representative examples, but these are mere examples for describing the present invention, and the present invention is not limited thereto.

Example 1

Figure 4:
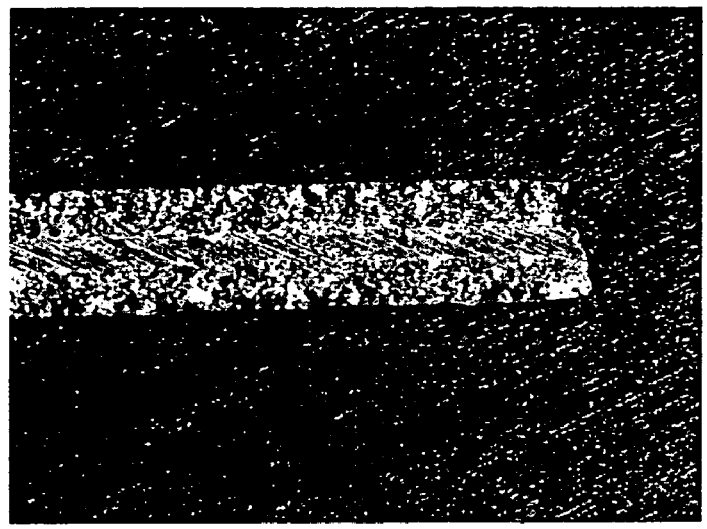
[FIG. 4] A cross-sectional photograph by an optical microscope (magnification: 200) of the chemically formed aluminum foil of Example 1.

A chemically formed aluminum foil in which x and y/z in FIG. 1 are respectively 30 μm and 0.3, a supplementary angle of cutting angle α (see FIG. 1) is 110°, the thickness as a whole (H) is 110 μm was used. Its enlarged cross-sectional photograph is shown in FIG. 4. Also, an enlarged photograph of the cut surface is shown in FIG. 10. The aluminum foil was cut into a size of 3 mm (short axis direction) ×10 mm (long axis direction), and a polyimide solution was circumferentially coated on both surfaces in a width of 1 mm to divide the surface into a 4-mm portion and a 5-mm portion in the long axis direction and then dried to provide a masking. A voltage of 4 V was applied to the 3 mm×4 mm portion of this chemically formed foil in a 10 mass % aqueous ammonium adipate solution to chemically form the cut end part and thereby produce a dielectric oxide film. Thereafter, this 3 mm×4 mm portion of the aluminum foil was dipped in a 2.0 mol/L isopropyl alcohol (IPA) solution having dissolved therein 3,4-ethylenedioxythiophene for 5 seconds and after drying at room temperature for 5 minutes, dipped in a 1.5 mol/L aqueous ammonium persulfate solution adjusted to have a sodium 2-anthraquinonesulfonate ($D_{50}=11$ μm; as measured with use of Master Sizer manufactured by Sysmex Corp.) concentration of 0.07 mass % for 5 seconds. Subsequently, this aluminum foil was left standing in air at 40° C. for 10 minutes to effect oxidative polymerization. These impregnation step and polymerization step as a whole were repeated 22 times, whereby a solid electrolyte layer of an electrically conducting polymer was formed on the outer surface of the aluminum foil. The finally produced poly(3,4-ethylenedioxythiophene) was washed with warm water at 50° C. and then dried at 100° C. for 30 minutes to complete the formation of the solid electrolyte layer.

The film thickness determined by observing the cross section at a corner part (the cut section at an inner angle of 110° between the edges) under a microscope was 22 μm. Thereafter, the 3 mm×4 mm portion having formed thereon a solid electrolyte layer was dipped in a 15 mass % aqueous ammonium adipate solution and by providing an anode contact point on the valve-acting metal foil in the portion where the solid electrolyte layer was not formed, a voltage of 3.8 V was applied to effect re-chemical formation.

After applying a carbon paste and a silver paste to the aluminum foil in the portion where the electrically conducting polymer composition layer was formed, as shown in FIG. 3, four aluminum foils were stacked and a cathode lead terminal was connected thereto. In the portion where the electrically conducting polymer composition layer was not formed, an anode lead terminal was connected by welding. The resulting laminated device was encapsulated with epoxy resin and then subjected to aging at 125° C. for 2 hours by applying a rated voltage (2 V). In this way, 30 units in total of capacitors were completed.

The capacitance and loss factor (tan δ×100 (%)) at 120 Hz, the equivalent series resistance (ESR) and the leakage current of these 30 units of laminated capacitor devices were measured as initial properties. The leakage current was measured one minute after the rated voltage was applied. These measured values each in terms of an average value and the defective ratio assuming that the capacitor with a leakage current of 0.002 CV or more is defective, are shown in Table 1. The average value of the leakage current is a value calculated by excluding defectives.

Example 2

Figure 5:
[FIG. 5] A cross-sectional photograph by an optical microscope (magnification: 500) of the chemically formed aluminum foil of Examples 2 and 3.

A chemically formed aluminum foil in which x and y/z in FIG. 1 are respectively 30 μm and 0.5, a supplementary angle of cutting angle α (see FIG. 1) is 110°, the thickness as a whole (H) is 110 μm was used. Its enlarged cross-sectional photograph is shown in FIG. 5. Except using this chemically formed aluminum foil, a solid electrolyte was formed in the same manner as in Example 1.

The film thickness at a corner part (the cut section at an inner angle of 110° between the edges) measured in the same manner as in Example 1 was 19 μm.

Thereafter, the re-chemical formation, the coating of a carbon paste and a silver paste, the stacking, the connection of a cathode lead terminal, the encapsulation with an epoxy resin, and the aging operation were performed in the same manner as in Example 1, and 30 units in total of capacitors were completed. The properties of the obtained laminated capacitor devices were evaluated in the same manner as in Example 1 and the results thereof are shown in Table 1.

Example 3

Figure 6:
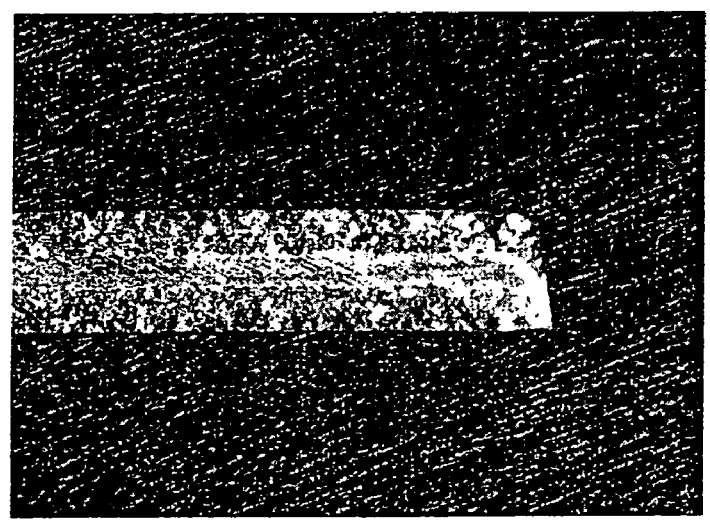
[FIG. 6] A cross-sectional photograph by an optical microscope (magnification: 200) of the chemically formed aluminum foil of Example 4.

A chemically formed aluminum foil in which x and y/z in FIG. 1 are respectively 30 μm and 0.8, a supplementary angle of cutting angle α (see FIG. 1) is 110°, the thickness as a whole (H) is 110 μm was used. Its enlarged cross-sectional photograph is shown in FIG. 6. Except using this chemically formed aluminum foil, a solid electrolyte was formed in the same manner as in Example 1.

The film thickness at a corner part (the cut section at an inner angle of 110° between the edges) measured in the same manner as in Example 1 was 17 μm.

Thereafter, the re-chemical formation, the coating of a carbon paste and a silver paste, the stacking, the connection of a cathode lead terminal, the encapsulation with an epoxy resin, and the aging operation were performed in the same manner as in Example 1, and 30 units in total of capacitors were completed. The properties of the obtained laminated capacitor devices were evaluated in the same manner as in Example 1 and the results thereof are shown in Table 1.

Example 4

Figure 7:
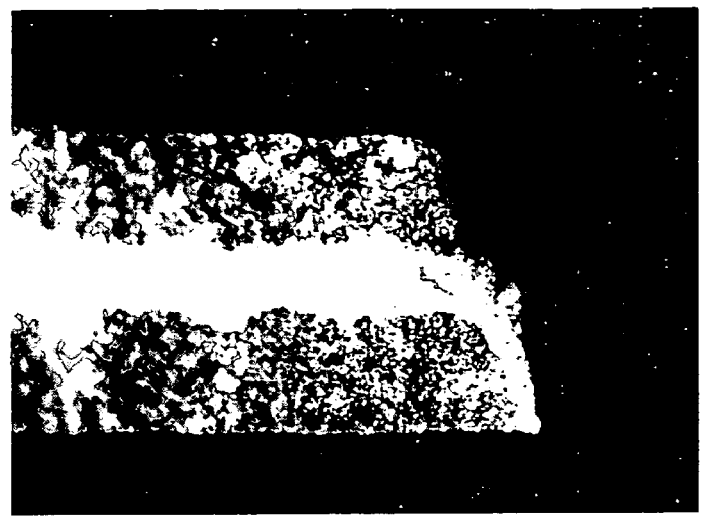
[FIG. 7] A cross-sectional photograph by an optical microscope (magnification: 500) of the chemically formed aluminum foil of Example 5.

A chemically formed aluminum foil in which x and y/z in FIG. 1 are respectively 30 μm and 1.0, cutting angle α (see FIG. 1) is 110°, the thickness as a whole (H) is 110 μm was used. Its enlarged cross-sectional photograph is shown in FIG. 7. Except using this chemically formed aluminum foil, a solid electrolytic layer was formed in the same manner as in Example 1. This chemically formed aluminum foil was produced by pressing a chemically formed aluminum foil cut in rectangles and winded around a rotation axis onto a plate with the cut side of the foil down and by bending a protruded part to remove it.

The film thickness at a corner part (the cut section at an inner angle of 110° between the edges) measured in the same manner as in Example 1 was 15 μm.

Thereafter, the re-chemical formation, the coating of a carbon paste and a silver paste, the stacking, the connection of a cathode lead terminal, the encapsulation with an epoxy resin, and the aging operation were performed in the same manner as in Example 1, and 30 units in total of capacitors were completed. The properties of the obtained laminated capacitor devices were evaluated in the same manner as in Example 1 and the results thereof are shown in Table 1.

Example 5

A chemically formed aluminum foil in which x and y/z in FIG. 1 are respectively 30 μm and 0.5, a supplementary angle of cutting angle α (see FIG. 1) is 100°, the thickness as a whole (H) is; 110 μm was used. Except using this chemically formed aluminum foil, a solid electrolyte was formed in the same manner as in Example 1.

The film thickness at a corner part (the cut section at an inner angle of 100° between the edges) measured in the same manner as in Example 1 was 21 μm.

Thereafter, the re-chemical formation, the coating of a carbon paste and a silver paste, the stacking, the connection of a cathode lead terminal, the encapsulation with an epoxy resin, and the aging operation were performed in the same manner as in Example 1, and 30 units in total of capacitors were completed. The properties of the obtained laminated capacitor devices were evaluated in the same manner as in Example 1 and the results thereof are shown in Table 1.

Comparative Example 1

Figure 8:
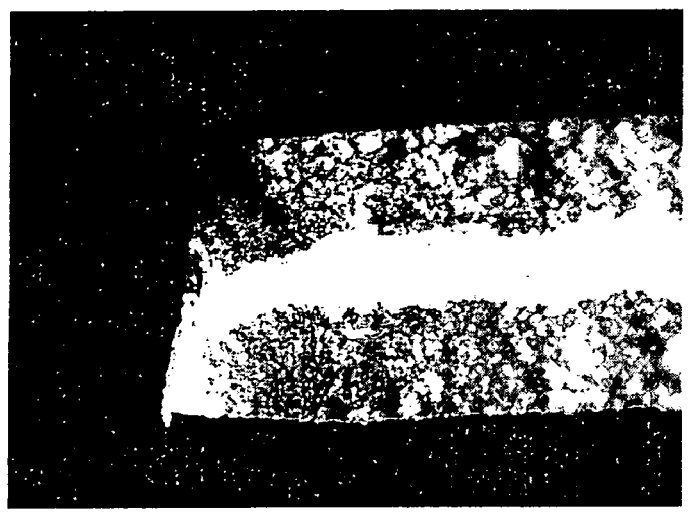
[FIG. 8] A cross-sectional photograph by an optical microscope (magnification: 500) of the chemically formed aluminum foil of Comparative Example 1.

A chemically formed aluminum foil in which x and y/z in FIG. 1 are respectively 30 μm and 1.2, a supplementary angle of cutting angle α (see FIG. 1) is 110°, the thickness as a whole (H) is 110 μm was used. Its enlarged cross-sectional photograph is shown in FIG. 8. Except using this chemically formed aluminum foil, a solid electrolyte was formed in the same manner as in Example 1.

The film thickness at a corner part (the cut section at an inner angle of 110° between the edges) measured in the same manner as in Example 1 was 3 μm.

Thereafter, the re-chemical formation, the coating of a carbon paste and a silver paste, the stacking, the connection of a cathode lead terminal, the encapsulation with an epoxy resin, and the-aging operation were performed in the same manner as in Example 1, and 30 units in total of capacitors were completed. The properties of the obtained laminated capacitor devices were evaluated in the same manner as in Example 1 and the results thereof are shown in Table 1.

Comparative Example 2

Figure 9:
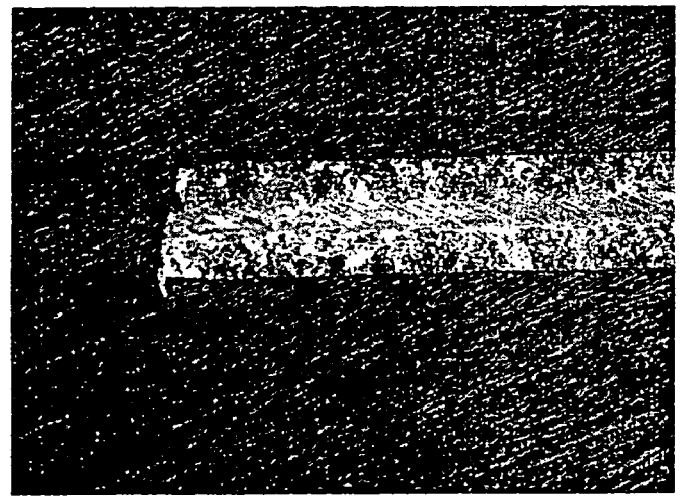
[FIG. 9] A cross-sectional photograph by an optical microscope (magnification: 200) of the chemically formed aluminum foil of Comparative Example 2.

A chemically formed aluminum foil in which x and y/z in FIG. 1 are respectively 30 μm and 1.5, a supplementary angle of cutting angle α (see FIG. 1) is 110°, the thickness as a whole (H) is 110 μm was used. Its enlarged cross-sectional photograph is shown in FIG. 9. Except using this chemically formed aluminum foil, a solid electrolyte was formed in the same manner as in Example 1.

The film thickness at a corner part (the cut section at an inner angle of 110° between the edges) measured in the same manner as in Example 1 was 1 μm.

Thereafter, the re-chemical formation, the coating of a carbon paste and a silver paste, the stacking, the connection of a cathode lead terminal, the encapsulation with an epoxy resin, and the aging operation were performed in the same manner as in Example 1, and 30 units in total of capacitors were completed. The properties of the obtained laminated capacitor devices were evaluated in the same manner as in Example 1 and the results thereof are shown in Table 1.

TABLE 1

| Example | Initial Properties | | | | |
| --- | --- | --- | --- | --- | --- |
| | Capacitance μF | Loss Factor % | ESR Ω | Leakage Current μA | Defective Ratio |
| Example 1 | 108 | 1.0 | 0.012 | 0.21 | 0/30 |
| Example 2 | 107 | 1.1 | 0.011 | 0.19 | 0/30 |
| Example 3 | 106 | 1.2 | 0.010 | 0.20 | 0/30 |
| Example 4 | 108 | 1.1 | 0.008 | 0.21 | 1/30 |
| Example 5 | 107 | 1.0 | 0.010 | 0.19 | 0/30 |
| Comparative Example 1 | 107 | 2.2 | 0.017 | 0.3 | 12/30 |
| Comparative Example 2 | 106 | 2.6 | 0.020 | 0.45 | 20/30 |

The chemically formed aluminum foil used in the following Examples were cut by using a slitter wherein plural disk-shaped blade units each comprising a thick blade and a thin blade are provided alternately with a minute gap between each other, thereby enabling cutting between a thin blade of one disk-shaped blade unit and a thick blade of another disk-shaped blade unit, and by adjusting the gap between the blade units so that the original sheet of an anode substrate passing between the units of the alternately provided disk-shaped blades can be ejected to a direction with a tilt angle of 1° to 15° against the cutting direction of the blade.

Example 6

Figure 16:
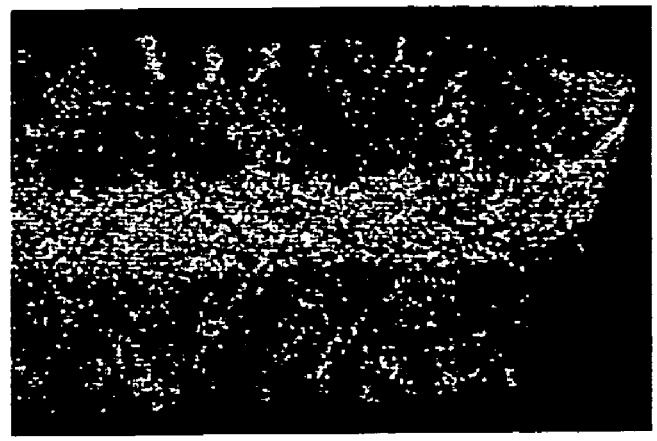
[FIG. 16] A cross-sectional photograph by an optical microscope (magnification: 500) of the chemically formed aluminum foil (anode substrate) of Example 6 in the direction of the thickness, wherein, the light color part and the dark color part respectively shows a not chemically-formed part and chemically-formed part in the aluminum foil.

A chemically formed aluminum foil having a shape of a wedge based on that in FIG. 13 in which each of angles a, b and c at three corners in the cross-sectional shape in the direction of the thickness is 165°, 120° and 90° (thickness: 100 μm) was used. The chemically formed foil was prepared by adjusting the gap between the blade units of the above-mentioned slitter so that the anode substrate can be ejected to with a tilt angle of 5°. Its enlarged cross-sectional photograph is shown in FIG. 16 and that of the cut surface in FIG. 21, respectively. The aluminum foil was cut into a size of 3 mm (short axis direction)×10 mm (long axis direction), and a polyimide solution was circumferentially coated on both surfaces in a width of 1 mm to divide the surface into a 4-mm portion and a 5-mm portion in the long axis direction and then dried to provide a masking. A voltage of 4 V was applied to the 3 mm×4 mm portion of this chemically formed foil in a 10 mass % aqueous ammonium adipate solution to chemically form the cut end part and thereby produce a dielectric oxide film. Thereafter, this 3 mm×4 mm portion of the aluminum foil was dipped in a 2.0 mol/L isopropyl alcohol (IPA) solution having dissolved therein 3,4-ethylenedioxythiophene for 5 seconds and after drying at room temperature for 5 minutes, dipped in a 1.5 mol/L aqueous ammonium persulfate solution adjusted to have a sodium 2-anthraquinonesulfonate ($D_{50}$=11 μm; as measured with use of Master Sizer manufactured by Sysmex Corp.) concentration of 0.07 mass % for 5 seconds. Subsequently, this aluminum foil was left standing in air at 40° C. for 10 minutes to effect oxidative polymerization. These impregnation step and polymerization step as a whole were repeated 20 times, whereby a solid electrolyte layer of an electrically conducting polymer was formed on the outer surface of the aluminum foil. The finally produced poly(3,4-ethylenedioxythiophene) was washed with warm water at 50° C. and then dried at 100° C. for 30 minutes to complete the formation of the solid electrolyte layer.

The film thickness determined by observing the cross section at a corner part under a microscope was uniform, respectively 17 μm, 15 μm and 15 μm at angle a, b and c.

Thereafter, the 3 mm×4 mm portion having formed thereon a solid electrolyte layer was dipped in a 15 mass % aqueous ammonium adipate solution and by providing an anode contact point on the valve-acting metal foil in the portion where the solid electrolyte layer was not formed, a voltage of 3.8 V was applied to effect re-chemical formation.

After applying a carbon paste and a silver paste to the aluminum foil in the portion where the electrically conducting polymer composition layer was formed, as shown in FIG. 3, four aluminum foils were stacked and a cathode lead terminal was connected thereto. In the portion where the electrically conducting polymer composition layer was not formed, an anode lead terminal was connected by welding. The resulting laminated device was encapsulated with epoxy resin and then subjected to aging at 125° C. for 2 hours by applying a rated voltage (2 V). In this way, 30 units in total of capacitors were completed.

The capacitance and loss factor (tan δ×100 (%)) at 120 Hz, the equivalent series resistance (ESR) and the leakage current of these 30 units of laminated capacitor devices were measured as initial properties. The leakage current was measured one minute after the rated voltage was applied. These measured values each in terms of an average value and the defective ratio assuming that the capacitor with a leakage current of 0.002 CV or more is defective, are shown in Table 2. The average value of the leakage current is a value calculated by excluding defectives.

Example 7

Figure 17:
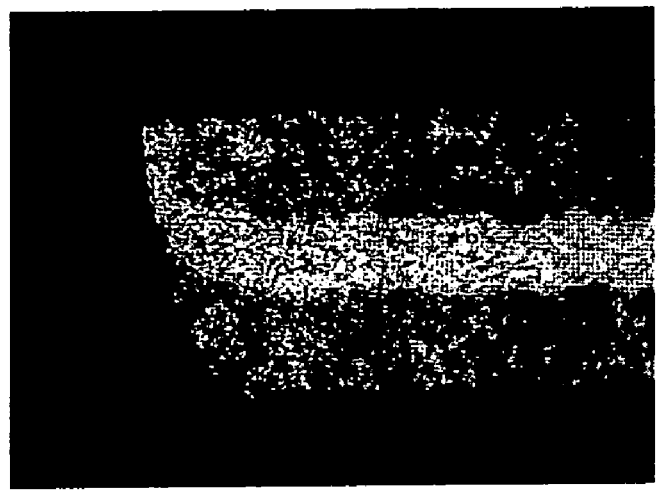
[FIG. 17] A cross-sectional photograph by an optical microscope (magnification: 500) of the chemically formed aluminum foil (anode substrate) of Example 7 in the direction of the thickness, wherein, the light color part and the dark color part respectively shows a not chemically-formed part and chemically-formed part in the aluminum foil.

A chemically formed aluminum foil having a cross-sectional shape of a wedge in the direction of the thickness in which each of angles a, b and c at three corners is 175°, 120° and 90° (thickness: 100 μm) was used. Its enlarged cross-sectional photograph is shown in FIG. 17. Except using this chemically formed aluminum foil, a solid electrolyte was formed in the same manner as in Example 6.

The film thickness determined by observing the cross section at a corner part under a microscope was uniform, respectively 15 μm, 12 μm and 12 μm at angles a, b and c.

Thereafter, the re-chemical formation, the coating of a carbon paste and a silver paste, the stacking, the connection of a cathode lead terminal, the encapsulation with an epoxy resin, and the aging operation were performed in the same manner as in Example 6, and 30 units in total of capacitors were completed. The properties of the obtained laminated capacitor devices were evaluated in the same manner as in Example 6 and the results thereof are shown in Table 2.

Example 8

A chemically formed aluminum foil having a cross-sectional shape of a wedge in the direction of the thickness in which each of angles a, b and c at three corners is respectively 105°, 135° and 105° (thickness: 100 μm) was used. Its enlarged cross-sectional photograph is shown in FIG. 19. The aluminum foil was produced by abrading for 15 minutes using a double-action grinder wherein No. 500 abrading agent is attached to the surface of a urethane support substrate. Except using this chemically formed aluminum foil, a solid electrolyte was formed in the same manner as in Example 6.

The film thickness determined by observing the cross section at a corner part under a microscope was uniform, respectively 16 μm, 14 μm and 16 μm at angles a, b and c.

Thereafter, the re-chemical formation, the coating of a carbon paste and a silver paste, the stacking, the connection of a cathode lead terminal, the encapsulation with an epoxy resin, and the aging operation were performed in the same manner as in Example 6, and 30 units in total of capacitors were completed. The properties of the obtained laminated capacitor devices were evaluated in the same manner as in Example 6 and the results thereof are shown in Table 2.

Example 9

A chemically formed aluminum foil having a cross-sectional shape of a wedge according to FIG. 12 in the direction of the thickness in which each of angles a, b, p1 and p2 at four corners is respectively 105°, 105°, 165° and 165° (thickness: 100 μm) was used. Its enlarged cross-sectional photograph is shown in FIG. 22. The aluminum foil was produced by polishing for 15 minutes using a double-action grinder wherein No. 320 abrading agent is attached to the surface of a urethane support substrate and subsequently by abrading for 2 minutes at an angle of 45° to the short axis of the anode substrate using waterproof abrasive paper No. 500. Except using this chemically formed aluminum foil, a solid electrolyte was formed in the same manner as in Example 6.

The film thickness determined by observing the cross section at a corner part under a microscope was uniform, respectively 15 μm, 14 μm, 15 μm and 16 μm at angles a, b, p1 and p2.

Thereafter, the re-chemical formation, the coating of a carbon paste and a silver paste, the stacking, the connection of a cathode lead terminal, the encapsulation with an epoxy resin, and the aging operation were performed in the same manner as in Example 6, and 30 units in total of capacitors were completed. The properties of the obtained laminated capacitor devices were evaluated in the same manner as in Example 6 and the results thereof are shown in Table 2.

Comparative Example 3

Figure 18:
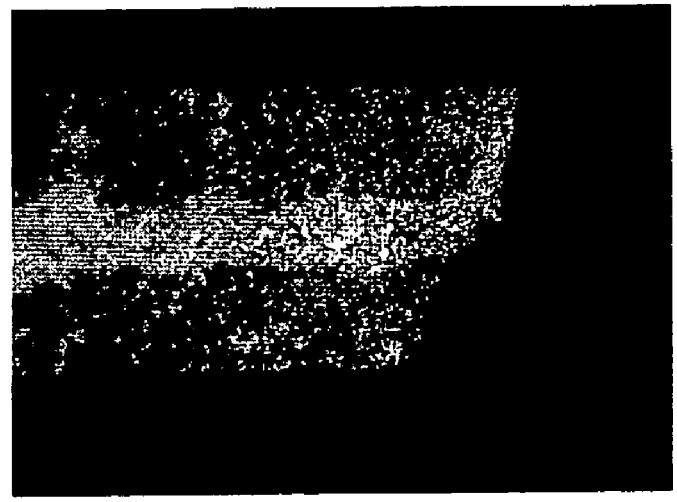
[FIG. 18] A cross-sectional photograph by an optical microscope (magnification: 500) of the chemically formed aluminum foil (anode substrate) of Comparative Example 3 in the direction of the thickness, wherein, the light color part and the dark color part respectively shows a not chemically-formed part and chemically-formed part in the aluminum foil.

A chemically formed aluminum foil having a cross-sectional shape of a sword in the direction of the thickness in which each of angles at two corners is 70° and 110° respectively (thickness: 100 μm) was used. Its enlarged cross-sectional photograph is shown in FIG. 18. Except using this chemically formed aluminum foil, a solid electrolytic layer was formed in the same manner as in Example 7.

The film thickness determined by observing the cross section at a corner part under a microscope was 3 μm and 15 μm, and the polymerized film was thin at a corner having an acute angle (a corner of 70°). Thereafter, 30 units in total of capacitors were completed in the same manner as in Example 7. The properties of the obtained laminated capacitor devices were evaluated in the same manner as in Example 7 and the results thereof are shown in Table 2.

TABLE 2

| | Initial Properties | | | | |
|---|---|---|---|---|---|
| Example | Capacitance μF | Loss Factor % | ESR Ω | Leakage Current μA | Defective Ratio |
| Example 6 | 109 | 1.1 | 0.008 | 0.19 | 0/30 |
| Example 7 | 108 | 1.3 | 0.010 | 0.17 | 0/30 |
| Example 8 | 108 | 1.3 | 0.010 | 0.17 | 0/30 |
| Example 9 | 109 | 1.0 | 0.007 | 0.16 | 0/30 |
| Comparative Example 3 | 108 | 2.0 | 0.011 | 0.35 | 5/30 |

INDUSTRIAL APPLICABILITY

According to the present invention, a thin capacitor element with reduced failure of short circuit and less fluctuation in the element shape can be stably produced, the number of capacitor elements stacked in a solid electrolytic capacitor chip can be increased to realize high capacitance, and a solid electrolytic capacitor element suitable for a solid electrolytic multilayer capacitor with less fluctuation in the equivalent series resistance can be provided.

The invention claimed is:

1. An anode substrate for a solid electrolytic capacitor, produced by cutting obliquely a metal substrate comprising a valve-acting metal layer having fine pores and a valve-acting metal layer without fine pores, and having a cut surface which is formed by elongation of the valve-acting metal layer without fine pores dragged by a cutting blade.

2. The anode substrate for a solid electrolytic capacitor as claimed in claim 1, wherein a layer of the elongated valve-acting metal which is generated by elongation of the valve-acting metal layer without fine pores dragged by a cutting blade and covering the edge part of the valve-acting layer having fine pores meets the requirement represented by the following formula:

$$0 \leq y/z \leq 1 \qquad \text{[Formula1]}$$

wherein y represents the thickness of the layer of the elongated valve-acting metal in the direction of the thickness of the substrate and z represents the thickness of the valve-acting layer having fine pores which is in contact with the elongated metal layer in the direction of the thickness of the substrate, respectively.

3. The anode substrate for a solid electrolytic capacitor as claimed in claim 2, which is in the form of a plate or foil and is obtained by cutting and removing the part of the elongated valve-acting metal layer protruded from the surface of the anode substrate.

4. The anode substrate for a solid electrolytic capacitor as claimed in claim 2, which is in the form of a plate or foil and is obtained by chamfering the edges including the part of the elongated valve-acting metal layer protruded from the surface of the anode substrate.

5. The anode substrate for a solid electrolytic capacitor as claimed in claim 2, which is in the form of a plate or foil and is obtained by pressing a forming material to the part of the elongated valve-acting metal layer protruded from the surface of the anode substrate thereby to eliminate the protrusion.

6. The anode substrate for a solid electrolytic capacitor as claimed in claim 2, and wherein the anode has grooves located obliquely or parallel to the direction of the short axis of the cut surface formed by the elongation of the valve-acting metal layer without pores of the anode substrate when dragged by a cutting blade.

7. The anode substrate for a solid electrolytic capacitor as claimed in claim 6, wherein the width of the grooves oblique or parallel to the direction of the short axis of the cut surface is from 0.1 to 1000 μm.

8. The anode substrate for a solid electrolytic capacitor as claimed in claim 6, wherein the pitch of the grooves oblique or parallel to the direction of the short axis of the cut surface is from 0.1 to 100 μm.

9. The anode substrate for a solid electrolytic capacitor as claimed in claim 6, wherein the depth of the grooves oblique or parallel to the direction of the short axis of the cut surface is from 0.1 to 10 μm.

10. The anode substrate for a solid electrolytic capacitor as claimed in claim 1, which is in the form of a plate or foil and is obtained by cutting obliquely so as to make the inner angle between the edges of the anode substrate surface from which cutting starts and the cut surface more than 90° to 135° or less.

11. The anode substrate for a solid electrolytic capacitor as claimed in claim 1, which is made of aluminum.

12. The anode substrate for a solid electrolytic capacitor as claimed in claim 11, wherein the anode substrate is produced by cutting in rectangles a chemically formed aluminum foil having fine pores by a cutting machine.

13. A solid electrolytic capacitor characterized by containing the anode substrate for a solid electrolytic capacitor claimed in claim 1.

14. A solid electrolytic capacitor characterized by comprising an anode substrate as claimed in claim 1, an edge of which is chamfered at least partially.

15. The solid electrolytic capacitor as claimed in claim 14, wherein an anode substrate is in the form of a plate or foil and its edge between an upper surface and/or lower surface and a side surface and/or end surface of an anode substrate is chamfered at least in the region on which a solid electrolytic layer is provided.

16. The solid electrolytic capacitor as claimed in claim 15, wherein the angle of a corner part between an upper surface and/or lower surface and a side surface and/or end surface in a chamfered part of an anode substrate is more than 90° and less than 180°.

17. The solid electrolytic capacitor as claimed in claim 16, wherein the cross-sectional view of a side surface and/or end surface of an anode substrate in the direction of the thickness has the shape of a wedge, the tip of which makes an angle of 90° or more and less than 180°.

18. The solid electrolytic capacitor as claimed in claim 14, wherein the width and/or length of an upper and lower surface of an anode substrate is different after chamfering.

19. The solid electrolytic capacitor as claimed in claim 14, wherein the cross-sectional view of a side surface and/or end surface of an anode substrate in the direction of the thickness after chamfering has the shape of an convex polygon of a trigona or more, each inner angle of the corners constituting the above cross-sectional shape is more than 90° and less than 180°.

20. The solid electrolytic capacitor as claimed in claim 14, wherein an anode substrate possesses grooves obliquely or parallel to the direction of the short axis of the cut surface formed by the elongation of the valve-acting metal layer without pores when dragged by a cutting blade, which layer is contained in the anode substrate treated by chamfering.

21. The solid electrolytic capacitor as claimed in claim 20, wherein the width of the grooves contained in the anode substrate is from 0.1 to 100 µm.

22. The method for producing a solid electrolytic capacitor, characterized by providing a dielectric layer and a solid electrolyte layer on the anode substrate as claimed in claim 21.

23. A solid electrolytic capacitor produced by the production method claimed in claim 22.

24. The method for producing a solid electrolytic capacitor, characterized by providing a solid electrolyte layer on the anode substrate having a dielectric film layer thereon as claimed in claim 21.

25. The method for producing the solid electrolytic capacitor claimed in claim 22 in which a solid electrolyte layer is provided on a valve-acting metal having thereon a dielectric film layer by a process comprising a step of dipping the valve-acting metal in a monomer-containing solution, followed by drying (Step 1) and a step of dipping the valve-acting metal in an oxidizing agent-containing solution, followed by drying (Step 2).

26. The method for producing a solid electrolytic capacitor as claimed in claim 25, wherein Step 1 of dipping a valve-acting metal having thereon a dielectric film layer in a monomer compound-containing solution, followed by drying and Step 2 of dipping the valve-acting acting metal in an oxidizing agent-containing solution, followed by drying, are repeated multiple times.

27. The method for producing a solid electrolytic capacitor as claimed in claim 25, wherein the oxidizing agent is a persulfate.

28. The method for producing a solid electrolytic capacitor as claimed in claim 25, wherein the oxidizing agent-containing solution is a suspension containing organic fine particles.

29. The method for producing a solid electrolytic capacitor as claimed in claim 28, wherein the average particle diameter ($D_{50}$) of the organic fine particles is from 0.1 to 20 µm.

30. The method for producing a solid electrolytic capacitor as claimed in claim 28, wherein the organic fine particle is at least one member selected from the group consisting of an aliphatic sulfonic acid compound, an aromatic sulfonic acid compound, an aliphatic carboxylic acid compound, an aromatic carboxylic acid compound, a salt thereof, and a peptide compound.

31. The solid electrolytic capacitor as claimed in claim 20, wherein the pitch of the grooves contained in the anode substrate is from 0.1 to 100 µm.

32. The solid electrolytic capacitor as claimed in claim 20, wherein the depth of the grooves contained in the anode substrate is from 0.1 to 10 µm.

33. The solid electrolytic capacitor as claimed in claim 14, wherein the anode substrate is made of valve-acting metal.

34. An anode substrate for a solid electrolytic capacitor used in a solid electrolytic capacitor as claimed in claim 21, characterized by that at least a part of the edge thereof is chamfered.

35. The anode substrate for a solid electrolytic capacitor as claimed in claim 34, which is produced through chamfering by pressing a cutter obliquely to an edge of an anode substrate.

36. The anode substrate for a solid electrolytic capacitor as claimed in claim 34, having a shape in which both of the upper and lower edges are chamfered by producing an intermediate product of an anode substrate wherein the inner angle between the edges of the upper surface and the cut surface is more than 90° by pressing a slitter to the original sheet of the anode substrate, and consequently by cutting so as to make the inner angle between the edges of the lower surface and the cut surface made by the slitter more than 90° by pressing a cutter to the edge of the lower surface of the intermediate product.

37. The anode substrate for a solid electrolytic capacitor as claimed in claim 34, having a shape in which both of the upper and lower edges are chamfered by producing an intermediate product of an anode substrate wherein the inner angle between the edges of the lower surface and the cut surface is more than 90° by pressing a slitter to the original sheet of the anode substrate, and consequently by cutting so as to make the inner angle between the edges of the upper surface and the cut surface made by the slitter more than 90° by pressing a cutter to the edge of the upper surface of the intermediate product.

38. The anode substrate for a solid electrolytic capacitor as claimed in claim 34, cut by using a slitter wherein plural disk-shaped blade units each comprising a thick blade and a thin blade are provided alternately with a minute gap between each other, thereby enabling cutting between a thin blade of one disk-shaped blade and a thick blade of another disk-shaped blade, and by adjusting the gap between the blade units so that the original sheet of an anode substrate passing between the units of the alternately provided disk-shaped blades can be ejected to a direction with a tilt angle of 1° to 15° against the cutting direction of the blade.

39. The anode substrate for a solid electrolytic capacitor as claimed in claim 34, chamfered by pressing the side surface of the cut off anode substrate to the surface of the polishing material existing on the surface of a rotating elastic support substrate.

40. A method for producing a solid electrolytic capacitor containing an anode substrate produced by cutting obliquely a metal substrate comprising a value-acting metal having fine pores and a valve-acting metal layer without fine pores, and having a cut surface which is formed by elongation of the valve-acting metal layer without fine pores dragged by a cutting blade, in which a dielectric film layer is formed on the valve-acting metal surface having fine pores and a solid electrolyte layer comprising an electrically conducting polymer composition is provided on the dielectric film by polymerizing a monomer with use of an oxidizing agent, wherein the solid electrolyte layer is provided on the valve-acting metal having a dielectric film layer thereon by a process comprising a step of dipping the valve-acting metal in a monomer-containing solution, followed by drying (Step 1) and a step of dipping the valve-acting metal in an oxidizing agent-containing solution, followed by drying (Step 2).

41. The method for producing a solid electrolytic capacitor as claimed in claim 40, wherein Step 1 of dipping a valve-acting metal having thereon a dielectric film layer in a monomer compound-containing solution, followed by drying and Step 2 of dipping the valve-acting metal in an oxidizing agent-containing solution, followed by drying, are repeated multiple times.

42. The method for producing a solid electrolytic capacitor as claimed in claim 40, wherein the oxidizing agent is a persulfate.

43. The method for producing a solid electrolytic capacitor as claimed in claim 40, wherein the oxidizing agent-containing solution is a suspension containing organic fine particles.

44. The method for producing a solid electrolytic capacitor as claimed in claim 43, wherein the average particle diameter ($D_{50}$) of the organic fine particles is from 1 to 20 μm.

45. The method for producing a solid electrolytic capacitor as claimed in claim 44, wherein the organic fine particle is at least one member selected from the group consisting of an aliphatic sulfonic acid compound, an aromatic sulfonic acid compound, an aliphatic carboxylic acid compound, an aromatic carboxylic acid compound, a salt thereof, and a peptide compound.

46. A solid electrolytic capacitor produced by the production method claimed in claim 40.

* * * * *